US011683839B2

(12) United States Patent
Taherzadeh Boroujeni et al.

(10) Patent No.: US 11,683,839 B2
(45) Date of Patent: Jun. 20, 2023

(54) PHYSICAL RANDOM ACCESS CHANNEL CONFIGURATION FOR A MAXIMUM PERMISSIBLE EXPOSURE CONDITION

(71) Applicant: QUALCOMM Incorporated, San Diego, CA (US)

(72) Inventors: Mahmoud Taherzadeh Boroujeni, San Diego, CA (US); Yan Zhou, San Diego, CA (US); Tao Luo, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 153 days.

(21) Appl. No.: 17/181,897

(22) Filed: Feb. 22, 2021

(65) Prior Publication Data

US 2021/0266976 A1   Aug. 26, 2021

Related U.S. Application Data

(60) Provisional application No. 62/980,668, filed on Feb. 24, 2020.

(51) Int. Cl.
*H04W 74/08*   (2009.01)

(52) U.S. Cl.
CPC ............................... *H04W 74/0833* (2013.01)

(58) Field of Classification Search
None
See application file for complete search history.

(56) References Cited

U.S. PATENT DOCUMENTS

| | | | |
|---|---|---|---|
| 11,057,938 B2* | 7/2021 | Islam | H04L 5/0035 |
| 11,349,545 B2* | 5/2022 | Tang | H04B 7/088 |
| 2017/0332333 A1* | 11/2017 | Santhanam | H04W 52/365 |
| 2019/0029049 A1* | 1/2019 | Akkarakaran | H04W 72/046 |
| 2019/0053271 A1* | 2/2019 | Islam | H04W 74/0866 |
| 2019/0159258 A1* | 5/2019 | Islam | H04L 5/0053 |
| 2019/0364599 A1* | 11/2019 | Islam | H04L 5/0048 |
| 2020/0145080 A1* | 5/2020 | Tang | H04B 7/0695 |
| 2021/0266976 A1* | 8/2021 | Taherzadeh Boroujeni | H04B 17/327 |
| 2021/0297104 A1* | 9/2021 | Zhou | H04B 7/0602 |

(Continued)

FOREIGN PATENT DOCUMENTS

WO   WO-2019037568 A1   2/2019

OTHER PUBLICATIONS

International Search Report and Written Opinion—PCT/US2021/070178—ISA/EPO—dated Jun. 8, 2021.

(Continued)

*Primary Examiner* — Faiyazkhan Ghafoerkhan
(74) *Attorney, Agent, or Firm* — Harrity & Harrity, LLP\Qualcomm Incorporated

(57) ABSTRACT

Various aspects of the present disclosure generally relate to wireless communication. In some aspects, receiving, from a base station, one or more configurations for a physical random access channel (PRACH) communication, and transmitting a PRACH communication according to a configuration selected from the one or more configurations based at least in part on the PRACH communication being subject to a maximum permissible exposure (MPE) condition and a rule. The rule may include a parameter that is received from the base station. Numerous other aspects are provided.

45 Claims, 16 Drawing Sheets

(56) References Cited

U.S. PATENT DOCUMENTS

| | | | | |
|---|---|---|---|---|
| 2021/0297959 A1* | 9/2021 | Zhou | ................... | H04W 72/535 |
| 2021/0345410 A1* | 11/2021 | Zhou | ................. | H04W 74/0833 |
| 2022/0046510 A1* | 2/2022 | Kung | ................... | H04L 5/0032 |
| 2022/0046635 A1* | 2/2022 | Liou | .................... | H04W 72/21 |
| 2022/0078670 A1* | 3/2022 | Kung | ................ | H04W 36/0069 |
| 2022/0085862 A1* | 3/2022 | Kung | ................... | H04L 1/1819 |
| 2022/0124642 A1* | 4/2022 | Xu | ....................... | H04B 17/102 |
| 2022/0159742 A1* | 5/2022 | Xu | ....................... | H04W 24/10 |

OTHER PUBLICATIONS

Qualcomm Incorporated: "Remaining Details on RACH Procedure", 3GPP Draft, 3GPP TSG-RAN WG1 Meeting RAN1 AH 1801, R1-1800851, 3rd Generation Partnership Project (3GPP), Mobile Competence Centre, 650, Route Des Lucioles, F-06921 Sophia-Antipolis Cedex, France, vol. RAN WG1. No. Vancouver, Canada, Jan. 22, 2018-Jan. 26, 2018 Jan. 13, 2018 (Jan. 13, 2018), XP051385123, 12 Pages, Retrieved from the Internet: URL:http://www.3gpp.org/ftp/tsg%5Fran/WG1%5FRL1/TSGR1%5FAH/NR%5FAH%5F1801/Docs/ [retrieved on Jan. 13, 2018] pp. 7-10, 7. Beam Reporting during RACH Procedure.
Co-Pending U.S. Appl. No. 17/181,981, inventor Taherzadeh Boroujeni; Mahmoud, filed Feb. 22, 2021.

* cited by examiner

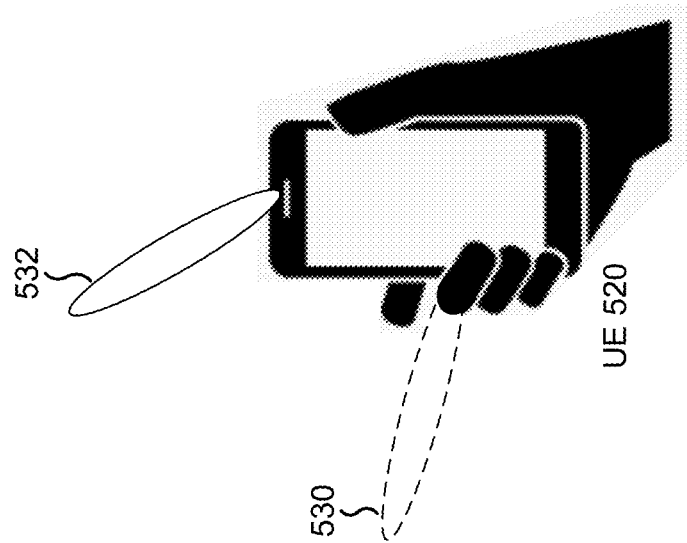
FIG. 5C
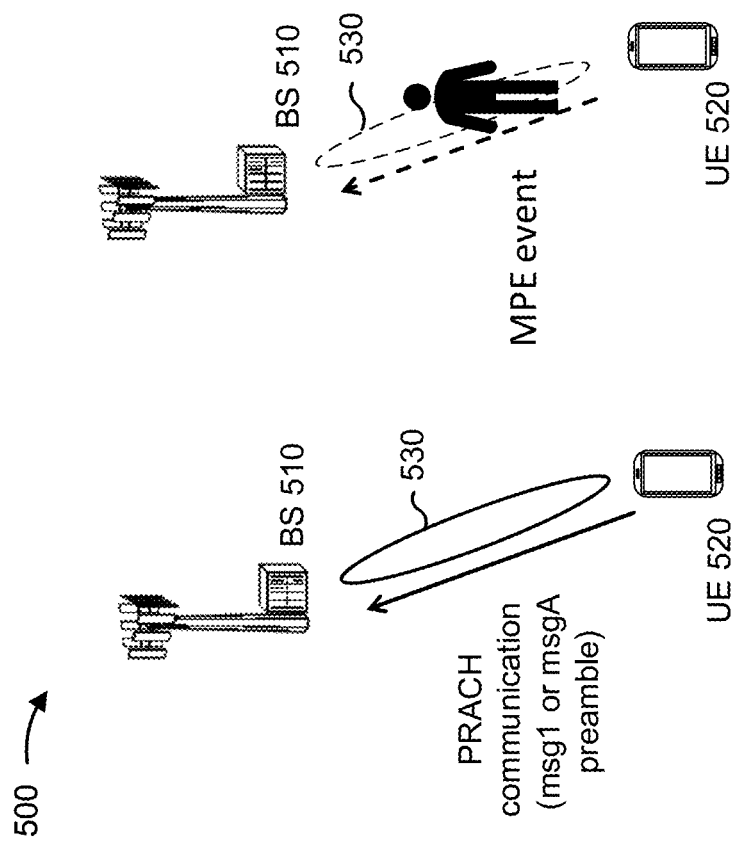
FIG. 5B
FIG. 5A

PHYSICAL RANDOM ACCESS CHANNEL CONFIGURATION FOR A MAXIMUM PERMISSIBLE EXPOSURE CONDITION

CROSS-REFERENCE TO RELATED APPLICATION

This Patent Application claims priority to U.S. Provisional Patent Application No. 62/980,668, filed on Feb. 24, 2020, entitled "PHYSICAL RANDOM ACCESS CHANNEL CONFIGURATION FOR A MAXIMUM PERMISSIBLE EXPOSURE CONDITION," and assigned to the assignee hereof. The disclosure of the prior Applications is considered part of and is incorporated by reference in this Patent Application.

INTRODUCTION

Aspects of the present disclosure generally relate to wireless communication and to techniques and apparatuses for configuring physical random access channel communications.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication performed by a user equipment (UE) may include receiving, from a base station, one or more configurations for a physical random access channel (PRACH) communication. The method may include transmitting a PRACH communication according to a configuration selected from the one or more configurations based at least in part on the PRACH communication being subject to a maximum permissible exposure (MPE) condition and a rule. The rule may include a parameter received from the base station.

In some aspects, a method of wireless communication performed by a base station may include transmitting, to a UE, one or more configurations for a PRACH communication. The method may include transmitting a parameter of a rule that the UE is to use for selecting, based at least in part on an MPE condition, a configuration of the one or more configurations. The method may include receiving the PRACH communication.

In some aspects, a UE for wireless communication may include a memory and one or more processors coupled to the memory. The memory and the one or more processors may be configured to receive, from a base station, one or more configurations for a PRACH communication. The memory and the one or more processors may be configured to transmit a PRACH communication according to a configuration selected from the one or more configurations based at least in part on the PRACH communication being subject to an MPE condition and a rule. The rule may include a parameter received from the base station.

In some aspects, a base station for wireless communication may include a memory and one or more processors coupled to the memory. The memory and the one or more processors may be configured to transmit, to a UE, one or more configurations for a PRACH communication. The memory and the one or more processors may be configured to transmit a parameter of a rule that the UE is to use for selecting, based at least in part on an MPE condition, a configuration of the one or more configurations, and receive the PRACH communication.

In some aspects, a non-transitory computer-readable medium may store a set of instructions for wireless communication that includes one or more instructions that, when executed by one or more processors of a UE, cause the UE to receive, from a base station, one or more configurations for a PRACH communication. The one or more instructions, when executed by one or more processors of the UE, may cause the one or more processors to transmit a PRACH communication according to a configuration selected from the one or more configurations based at least in part on the PRACH communication being subject to an MPE condition and a rule. The rule may include a parameter received from the base station.

In some aspects, a non-transitory computer-readable medium may store a set of instructions for wireless communication that includes one or more instructions that, when executed by one or more processors of a base station, cause the base station to transmit, to a UE, one or more configurations for a PRACH communication. The one or more instructions, when executed by one or more processors of the base station, may cause the one or more processors to transmit a parameter of a rule that the UE is to use for selecting, based at least in part on an MPE condition, a configuration of the one or more configurations, and receive the PRACH communication.

In some aspects, an apparatus for wireless communication may include means for receiving, from a base station, one or more configurations for a PRACH communication. The apparatus may include means for transmitting a PRACH communication according to a configuration selected from the one or more configurations based at least in part on the PRACH communication being subject to an MPE condition and a rule, the rule including a parameter received from the base station.

In some aspects, an apparatus for wireless communication may include means for transmitting, to a UE, one or more configurations for a PRACH communication. The apparatus may include means for transmitting a parameter of a rule that the UE is to use for selecting, based at least in part on an MPE condition, a configuration of the one or more configurations, and means for receiving the PRACH communication.

In some aspects, a method of wireless communication, performed by a UE, may include determining a configuration for a PRACH communication based at least in part on a determination that the PRACH communication is subject to an MPE condition. The method may include transmitting the PRACH communication based at least in part on the configuration.

In some aspects, a method of wireless communication, performed by a base station, may include determining a configuration for a UE to use for a PRACH communication that is subject to an MPE condition and transmitting the configuration to the UE. The method may include receiving the PRACH communication according to the configuration.

In some aspects, a UE for wireless communication may include a memory and one or more processors coupled to the memory. The memory and the one or more processors may be configured to determine a configuration for a PRACH communication based at least in part on a determination that the PRACH communication is subject to an MPE condition, and transmit the PRACH communication based at least in part on the configuration.

In some aspects, a base station for wireless communication may include a memory and one or more processors coupled to the memory. The memory and the one or more processors may be configured to determine a configuration for a UE to use for a PRACH communication that is subject to an MPE condition, transmit the configuration to the UE, and receive the PRACH communication according to the configuration.

In some aspects, a non-transitory computer-readable medium may store one or more instructions for wireless communication. The one or more instructions, when executed by one or more processors of a UE, may cause the one or more processors to determine a configuration for a PRACH communication based at least in part on a determination that the PRACH communication is subject to an MPE condition, and transmit the PRACH communication based at least in part on the configuration.

In some aspects, a non-transitory computer-readable medium may store one or more instructions for wireless communication. The one or more instructions, when executed by one or more processors of a base station, may cause the one or more processors to determine a configuration for a UE to use for a PRACH communication that is subject to an MPE condition, transmit the configuration to the UE, and receive the PRACH communication according to the configuration.

In some aspects, an apparatus for wireless communication may include means for determining a configuration for a PRACH communication based at least in part on a determination that the PRACH communication is subject to an MPE condition, and means for transmitting the PRACH communication based at least in part on the configuration.

In some aspects, an apparatus for wireless communication may include means for determining a configuration for a UE to use for a PRACH communication that is subject to an MPE condition, means for transmitting the configuration to the UE, and means for receiving the PRACH communication according to the configuration.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 5A-5C are diagrams illustrating examples of maximum permissible exposure (MPE) conditions, in accordance with the present disclosure.

DETAILED DESCRIPTION

Figure 1:
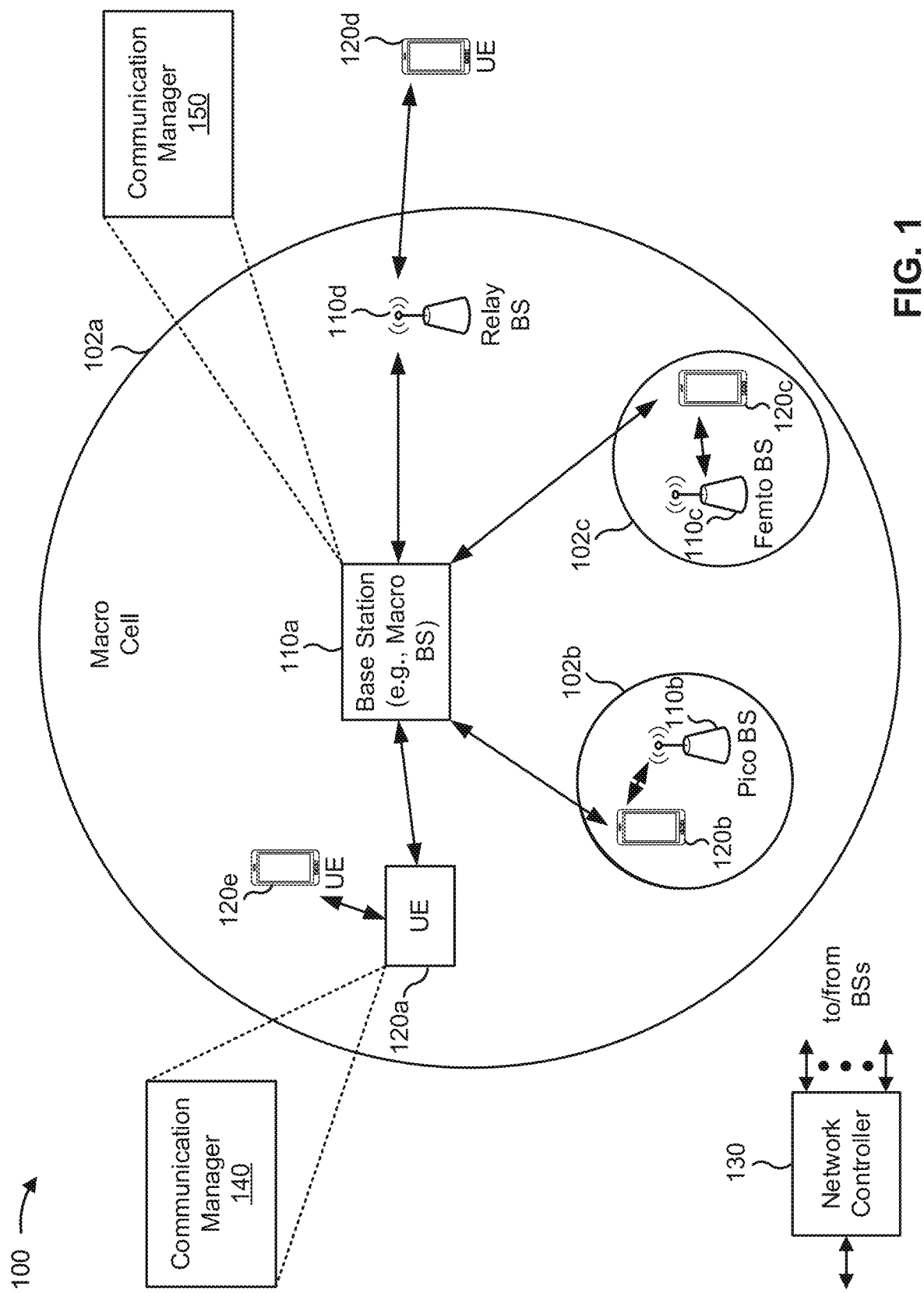
FIG. 1 is a diagram illustrating an example of a wireless communication network, in accordance with the present disclosure.

A user equipment (UE) may use a random access channel (RACH) procedure to synchronize with a base station and to establish a radio resource control (RRC) connection to the base station. This may give the UE the capability to transmit data to and receive data from the base station. To start the RACH procedure, the UE may transmit a random access channel (RACH) message to the base station to initiate communication with the base station. The RACH message may be a physical RACH (PRACH) communication, or a communication transmitted on the PRACH. The PRACH communication may be a preamble, which is one of multiple patterns or signatures recognized by the base station. The UE may use the PRACH communication to request an uplink allocation from the base station.

Some governing bodies have placed restrictions on a peak radiated power that can be directed toward a human body. These restrictions are sometimes referred to as maximum permissible exposure (MPE) limitations, MPE constraints, and/or the like. A PRACH communication may be subject to an MPE condition. If the MPE condition causes the PRACH communication to fail, the device transmitting the PRACH communication will waste resources and latency will increase.

According to various aspects described herein, a UE may transmit the PRACH communication with an alternative PRACH configuration if the PRACH communication is subject to an MPE condition. For example, the UE may transmit the PRACH communication with a PRACH format, a PRACH length, a set of PRACH sequences, a bandwidth, or a combination thereof that is different than if the PRACH communication is not subject to an MPE condition.

In some aspects, the UE may use a rule for selecting a PRACH configuration if the PRACH communication is subject to an MPE condition. The UE may receive a parameter for the rule from a base station. For example, the UE may receive an updated signal strength threshold as a trigger for when the UE is to use the alternative PRACH configuration. By dynamically providing a parameter for the rule for selecting a PRACH configuration, the base station may exercise more flexibility in handling MPE conditions at the UE.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, and/or algorithms (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as a base station, a NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, and/or a relay.

Wireless network 100 may be a heterogeneous network that includes BSs of different types, such as macro BSs, pico BSs, femto BSs, and/or relay BSs. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, and/or a station. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., a smart ring, a smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology or an air interface. A frequency may also be referred to as a carrier or a frequency channel Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In some aspects, UE 120 may perform scheduling operations, resource selection operations, and/or other operations described elsewhere herein as being performed by the base station 110.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" (mmWave) band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

As shown in FIG. 1, UE 120 may include a communication manager 140. As described in more detail elsewhere herein, communication manager 140 may determine a configuration for a PRACH communication based at least in part on a determination that the PRACH communication is subject to an MPE condition. Communication manager 140 may transmit the PRACH communication based at least in part on the configuration. Additionally, or alternatively, the communication manager 140 may perform one or more other operations described herein.

Similarly, base station 110 may include a communication manager 150. As described in more detail elsewhere herein, communication manager 150 may determine a configuration for a UE to use for a PRACH communication that is subject to an MPE condition, and transmit the configuration to the UE. Communication manager 150 may receive the PRACH communication according to the configuration. Additionally, or alternatively, communication manager 150 may perform one or more other operations described herein.

As shown in FIG. 1, UE 120 may include a communication manager 140. As described in more detail elsewhere herein, communication manager 140 may receive, from a base station, one or more configurations for a PRACH communication. Communication manager 140 may transmit a PRACH communication according to a configuration selected from the one or more configurations based at least in part on the PRACH communication being subject to an MPE condition and a rule, the rule including a parameter received from the base station. Additionally, or alternatively, communication manager 140 may perform one or more other operations described herein.

Similarly, the base station 110 may include a communication manager 150. As described in more detail elsewhere herein, communication manager 150 may transmit, to a UE, one or more configurations for a PRACH communication. Communication manager 150 may transmit a parameter of a rule that the UE is to use for selecting, based at least in part on an MPE condition, a configuration of the one or more configurations. Communication manager 150 may receive the PRACH communication. Additionally, or alternatively, communication manager 150 may perform one or more other operations described herein.

As indicated above, FIG. 1 is provided merely as an example. Other examples may differ from what is described with regard to FIG. 1.

Figure 2:
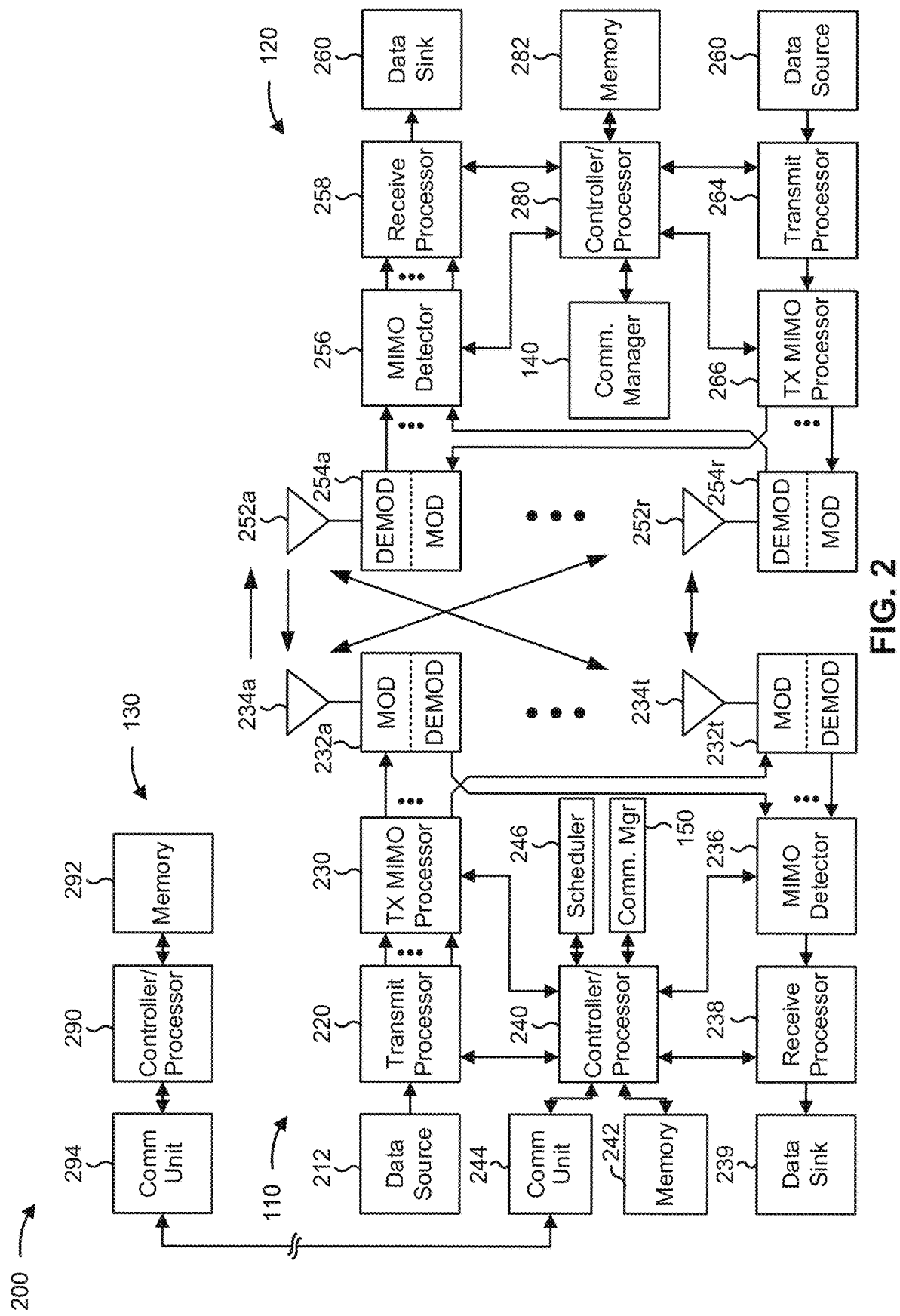
FIG. 2 is a diagram illustrating an example of a base station in communication with a UE in a wireless communication network, in accordance with the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), and/or CQI. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with PRACH configuration for an MPE condition, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for determining a configuration for a PRACH communication based at least in part on a determination that the PRACH communication is subject to an MPE condition, and/or means for transmitting the PRACH communication based at least in part on the configuration. Additionally, or alternatively, UE 120 may include means for performing one or more other operations described herein. In some aspects, such means may include communication manager 140. Additionally, or alternatively, such means may include one or more components of UE 120 described in connection with FIG. 2.

In some aspects, base station 110 may include means for determining a configuration for a UE to use for a PRACH communication that is subject to an MPE condition, means for transmitting the configuration to the UE, and/or means for receiving the PRACH communication according to the configuration. Additionally, or alternatively, base station 110 may include means for performing one or more other operations described herein. In some aspects, such means may include communication manager 150. In some aspects, such means may include one or more components of base station 110 described in connection with FIG. 2.

In some aspects, UE 120 may include means for receiving, from a base station, one or more configurations for a PRACH communication, and/or means for transmitting a PRACH communication according to a configuration selected from the one or more configurations based at least in part on the PRACH communication being subject to an MPE condition and a rule. The rule may include a parameter received from the base station. The means for UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282. In some aspects, UE 120 may include means for receiving, from the base station, the rule for selecting the configuration.

In some aspects, base station 110 may include means for transmitting, to a UE, one or more configurations for a PRACH communication, and/or means for transmitting a parameter of a rule that the UE is to use for selecting, based at least in part on an MPE condition, a configuration of the one or more configurations, and/or means for receiving the PRACH communication. The means for base station 110 to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. In some aspects, base station 110 includes means for transmitting the rule to the UE.

As indicated above, FIG. 2 is provided merely as an example. Other examples may differ from what is described with regard to FIG. 2.

Figure 3:
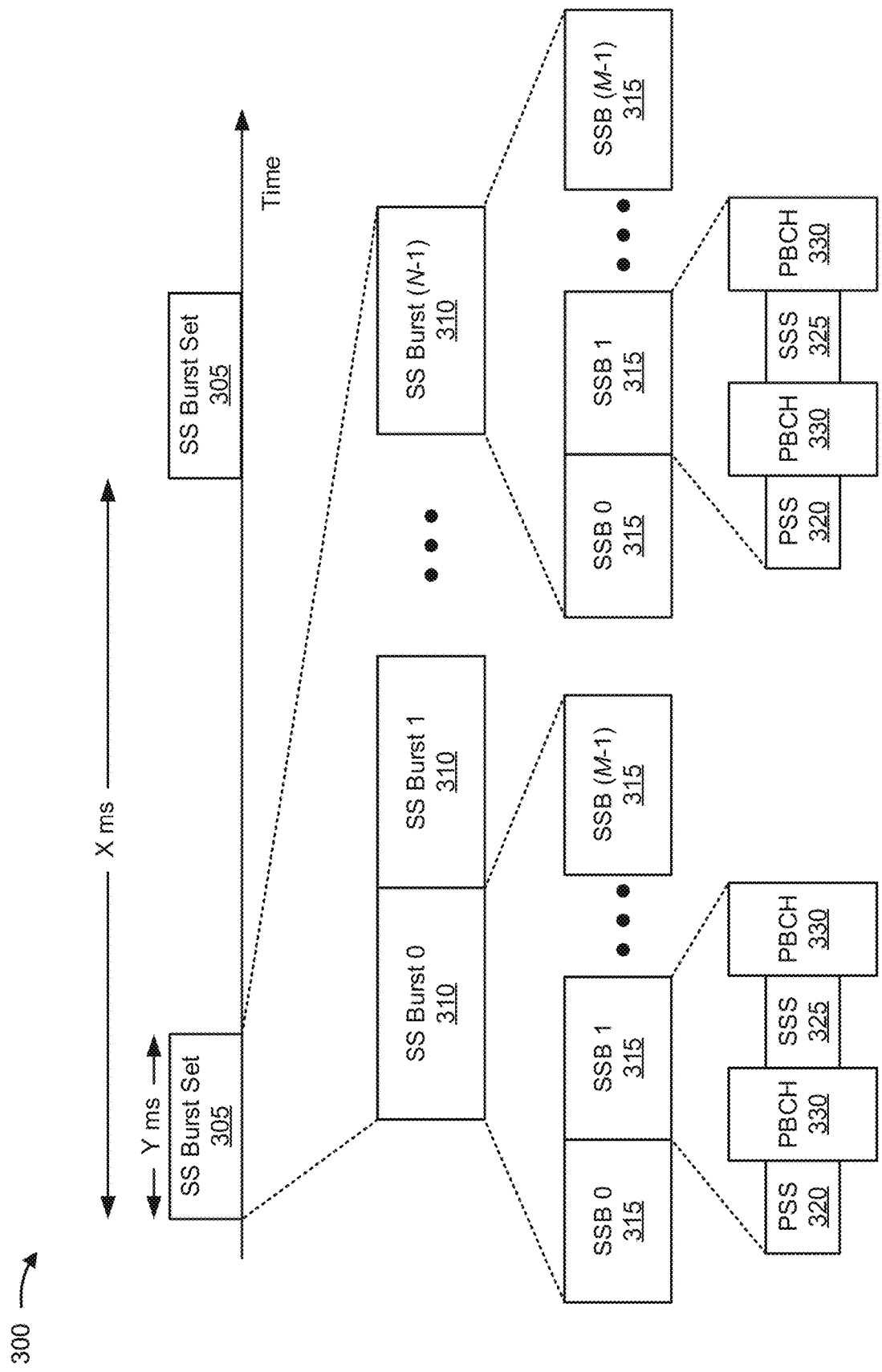
FIG. 3 is a diagram illustrating an example of a synchronization signal (SS) hierarchy, in accordance with the present disclosure.

FIG. 3 is a diagram illustrating an example 300 of a synchronization signal (SS) hierarchy, in accordance with the present disclosure. As shown in FIG. 3, the SS hierarchy may include an SS burst set 305, which may include multiple SS bursts 310, shown as SS burst 0 through SS burst N−1, where N is a maximum number of repetitions of the SS burst 310 that may be transmitted by the base station. As further shown, each SS burst 310 may include one or more SS blocks (SSBs) 315, shown as SSB 0 through SSB M−1, where M is a maximum number of SSBs 315 that can be carried by an SS burst 310. In some aspects, different SSBs 315 may be beam-formed differently (e.g., transmitted using different beams), and may be used for beam management, beam selection, and/or the like (e.g., as part of an initial network access procedure). An SS burst set 305 may be periodically transmitted by a wireless node (e.g., base station 110), such as every X milliseconds, as shown in FIG. 3. In some aspects, an SS burst set 305 may have a fixed or dynamic length, shown as Y milliseconds in FIG. 3. In some aspects, wide broadcast SSB beams may be used for RACH procedures.

In some aspects, an SSB 315 may include resources that carry a primary synchronization signal (PSS) 320, a secondary synchronization signal (SSS) 325, and/or a physical broadcast channel (PBCH) 330. In some aspects, multiple SSBs 315 are included in an SS burst 310 (e.g., with transmission on different beams), and the PSS 320, the SSS 325, and/or the PBCH 330 may be the same across each SSB 315 of the SS burst 310. In some aspects, a single SSB 315 may be included in an SS burst 310. In some aspects, SSB 315 may be at least four symbols (e.g., OFDM symbols) in length, where each symbol carries one or more of the PSS 320 (e.g., occupying one symbol), SSS 325 (e.g., occupying one symbol), and/or the PBCH 330 (e.g., occupying two symbols). In some aspects, an SSB 315 may be referred to as an SS/PBCH block.

In some aspects, the symbols of an SSB 315 are consecutive, as shown in FIG. 3. In some aspects, the symbols of an SSB 315 are non-consecutive. Similarly, in some aspects, one or more SSBs 315 of SS burst 310 may be transmitted in consecutive radio resources (e.g., consecutive symbols) during one or more slots. Additionally, or alternatively, one or more SSBs 315 of SS burst 310 may be transmitted in non-consecutive radio resources.

In some aspects, SS bursts 310 may have a burst period, and SSBs 315 of SS burst 310 may be transmitted by a wireless node (e.g., base station 110) according to the burst period. In this case, SSBs 315 may be repeated during each SS burst 310. In some aspects, SS burst set 305 may have a burst set periodicity, whereby SS bursts 310 of SS burst set 305 are transmitted by the wireless node according to the fixed burst set periodicity. In other words, SS bursts 310 may be repeated during each SS burst set 305.

In some aspects, an SSB 315 may include an SSB index that corresponds to a beam used to carry the SSB 315. A UE 120 may monitor for and/or measure SSBs 315 using different receive (Rx) beams during an initial network access procedure. Based at least in part on the monitoring and/or measuring, UE 120 may indicate one or more SSBs 315 with a best signal parameter (e.g., an RSRP parameter and/or the like) to a base station 110. Base station 110 and UE 120 may use the one or more indicated SSBs 315 to select one or more beams to be used for communication between base station 110 and UE 120 (e.g., for a RACH procedure and/or the like). In some aspects, a UE may use an RSRP of an SSB broadcast to help determine a configuration for a PRACH communication.

As indicated above, FIG. 3 is provided as an example. Other examples may differ from what is described with regard to FIG. 3.

As explained earlier, a UE may transmit a RACH message to a base station to initiate communication with the base station. The RACH message may be what the UE first transmits when the UE is powered on. The RACH message may be transmitted on a PRACH and may be referred to more generally as a PRACH communication. The UE may use the PRACH communication to request an uplink allocation from the base station.

A PRACH communication may include a PRACH sequence (also referred to as a PRACH preamble or a PRACH preamble sequence) that may be used to differentiate UEs. The UE may use a PRACH format to determine the PRACH sequence and/or transmission properties of the PRACH sequence. The UE may receive an initial PRACH configuration in a transmission from the base station and use the initial PRACH configuration for transmitting the PRACH communication. The PRACH communication may initiate a RACH procedure to obtain the uplink allocation.

Figures 4A, 4B:
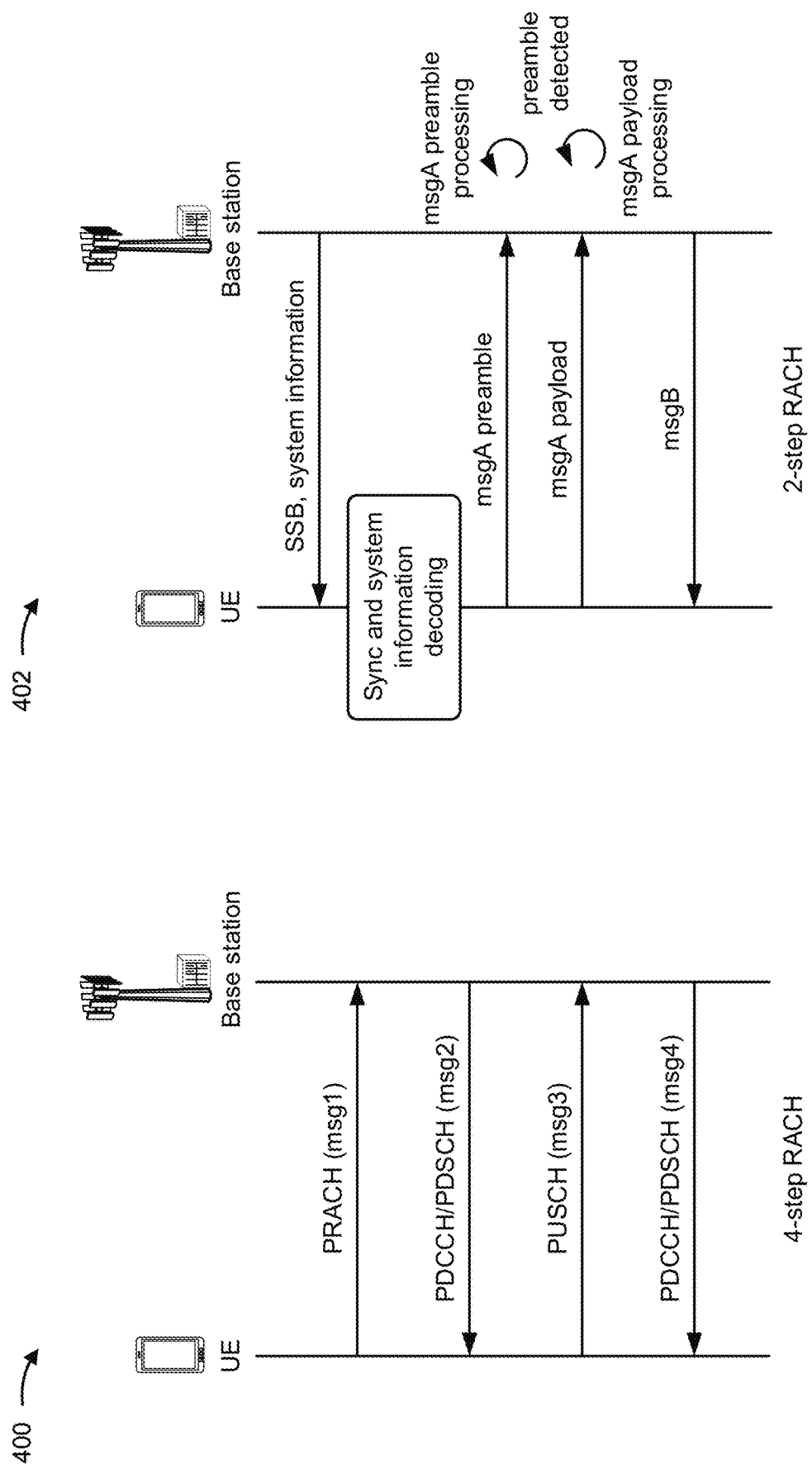
FIG. 4A is a diagram illustrating an example of a 4-step random access channel (RACH) procedure, in accordance with the present disclosure.
FIG. 4B is a diagram illustrating an example of a 2-step RACH procedure, in accordance with the present disclosure.

FIG. 4A is a diagram illustrating an example 400 of a 4-step RACH procedure and FIG. 4B is a diagram illustrating an example 402 of a 2-step RACH procedure. In each example, a UE is performing a RACH procedure with a base station.

In LTE and NR, the 4-step RACH procedure may be a RACH procedure with a four message (msg1, msg2, msg3, msg4) handshake between the UE and the base station. The UE may transmit msg1 with a PRACH preamble to the base station on a PRACH, as an example of a PRACH communication. The PRACH communication may follow a PRACH configuration selected based on a rule for selecting PRACH configurations when the UE is subject to an MPE condition. The base station may transmit msg2 to the UE on a physical downlink control channel (PDCCH) and a physical downlink shared channel (PDSCH). Msg2 may include a random access response. The UE may transmit msg3 on a physical uplink shared channel (PUSCH). Msg3 may include a contention request and device information. The base station may transmit msg4 on the PDCCH and the PDSCH. Msg4 may include a contention resolution. The contention request and contention resolution relate to resolving contention from multiple UEs that happen to use the same PRACH preamble.

In NR, the 2-step RACH procedure is another RACH procedure. In the 2-step procedure, a base station broadcasts system information and SSB information to UEs. A UE may transmit a PRACH preamble as part of a msgA message to the base station, as an example of a PRACH communication. The PRACH communication may follow a PRACH configuration selected based on a rule for selecting PRACH configurations when the UE is subject to an MPE condition. The rule may apply whether the PRACH communication is a msg3 of a 4-step RACH procedure or a msgA of a 2-step RACH procedure. MsgA may also include a payload. The base station may process the preamble, detect the preamble, and process the payload. The base station may send a response in msgB. Msg1 and msg3 of the 4-step RACH may be considered to be collapsed into the msgA, and msg2 and msg4 are considered to be collapsed into msgB.

Depending on the PRACH configuration selected due to an MPE condition, the UE may transmit the PRACH communication with a PRACH format, a PRACH length, a set of PRACH sequences, a bandwidth, or a combination thereof that is different than if the PRACH communication is not subject to an MPE condition. As indicated above, FIGS. 4A and 4B are provided as two examples of a RACH procedure. Other examples may differ from what is described with regard to FIGS. 4A and 4B.

FIGS. 5A-5C are diagrams illustrating an example 500 of an MPE condition. FIG. 5A shows a BS 510 and a UE 520 that may communicate with each other.

As shown in FIG. 5A, UE 520 and BS 510 may have the capability to communicate via one or more beams. In some cases, an uplink beam, such as beam 530, may be a mmWave beam that carries a communication in the mmWave frequency band. The communication may be a PRACH communication, such as a msg1 preamble (4-step RACH procedure) or a msg1 preamble (2-step RACH procedure), as described in connection with FIGS. 4A and 4B. When transmitting in the mmWave frequency band, a transmitter may use a higher antenna gain than when transmitting in the sub-6 GHz frequency band. As a result, the effective isotropic radiated power (EIRP), which represents the radiated power in a particular direction (e.g., the direction of the beam), may be higher for mmWave communications than for sub-6 GHz communications. Some governing bodies have placed restrictions on the peak EIRP that can be directed toward the human body. These restrictions are sometimes referred to as MPE limitations or MPE constraints.

An MPE condition or event may be due to a blocking scenario, shown by FIG. 5B, where a human body blocks or obstructs beam 530 from an antenna subarray of UE 520. In another scenario shown by FIG. 5C, a human hand may be positioned near an antenna subarray of UE 520. Beam 530 may be transmitting a threshold level of EIRP towards the hand and thus UE 520 is subject to an MPE condition. By contrast, beam 532 is not transmitting through a human body part and thus is not subject to an MPE condition. Additionally, or alternatively, the MPE condition may be due to the position of another body part of the user, such as the user's face, head, ear, and/or leg.

Beam 530 is an uplink beam that may match a downlink beam so as to form a reciprocal beam pair. When UE 520 is subject to an MPE condition, a downlink beam of the reciprocal beam pair may be suitable for use by UE 520 to receive communications from BS 510, and may have better beam conditions (e.g., a stronger beam) as compared to other downlink beams. However, beam 530 of the reciprocal beam pair may not be permitted for transmission of communications by UE 520 due to the MPE condition. For example, the downlink beam may not be subject to an MPE constraint because an EIRP level of a transmission by stations 510 may subside by the time the transmission reaches UE 520 and/or the user's hand or other body part. However, uplink beam 130 may be subject to an MPE constraint (e.g., maximum transmit power) because an EIRP level of a transmission by UE 520 may exceed a permitted EIRP level due to the close proximity of UE 520 and the hand or other body part.

In such a case, it may be beneficial for UE 520 and/or BS 510 to use a first beam for uplink communications and a second beam for downlink communications, where the first beam (e.g., a UE uplink beam or a BS uplink beam) does not form a reciprocal beam pair with the second beam (e.g., a UE downlink beam or a BS downlink beam). In some aspects, UE 520 may select non-reciprocal UE beams to communicate with BS 510 even if BS 510 is using reciprocal BS beams to communicate with UE 510. For example, UE uplink beam may be included in another cluster of beams. By choosing distinct UE uplink and UE downlink beams, the UE may improve performance while satisfying an MPE constraint.

UE 520 may determine, for a candidate UE uplink beam, such as beam 530, a maximum transmit power due to an MPE constraint (e.g., an MPE limitation, an MPE restriction). As used herein, the maximum transmit power due to the MPE constraint may be referred to as an MPE-constrained maximum transmit power. That is, UE 520 may not use a transmit power that exceeds the MPE-constrained maximum power. In some aspects, the MPE-constrained maximum transmit power for a candidate UE uplink beam may vary over time due to, for example, movement of UE 520 and/or a rotation of UE 520. Thus, UE 520 may determine the MPE-constrained maximum transmit power for a candidate UE uplink beam at a specific time and/or for a specific time period.

In some aspects, UE 520 may determine the MPE-constrained maximum transmit power for a candidate UE uplink beam based at least in part on an EIRP value for the candidate UE uplink beam, a maximum or peak EIRP value stored by UE 520 (e.g., as dictated by a governing body, as specified in a wireless communication standard, as configured for UE 520) and/or a determination of whether the candidate UE uplink beam is directed toward a body (e.g., a human body). For example, if the candidate UE uplink beam is not directed toward a body, then UE 520 may set the MPE-constrained maximum transmit power to a maximum transmit power value for UE 520, which may be stored by UE 520, may be determined based at least in part on a class of UE 520 or specified by a wireless communication standard. However, if the candidate UE uplink beam is directed toward a body, then UE 520 may set the MPE-constrained maximum transmit power based at least in part on a determined EIRP value for the candidate UE uplink beam and/or a maximum permitted EIRP value.

As shown by FIGS. 5B and 5C, UE 520 may prepare to transmit the PRACH communication to BS 510 but uplink beam 530 may be subject to an MPE condition and may not be able to select another beam for the PRACH communication. If UE 520 does not account for the MPE condition, the PRACH communication may fail. This failure may cause the UE to waste signaling resources and increase latency for establishing a connection to BS 510.

According to various aspects described herein, UE 520 may transmit the PRACH communication with an alternative PRACH configuration if UE 520 determines that the PRACH communication is subject to an MPE condition. For example, UE 520 may transmit the PRACH communication with a PRACH format, a PRACH length, a set of PRACH sequences, a bandwidth, or a combination thereof that is different than if the PRACH communication is not subject to an MPE condition. UE 520 may select an alternative PRACH configuration according to a rule. For example, UE 520 may select an alternative PRACH format if a signal strength satisfies a signal strength threshold. Due to changing conditions, this threshold or other rule parameter may need to be adjusted. In some aspects, BS 510 may transmit the threshold or other parameter to UE 520. In this way, BS 510 may successfully receive the PRACH communication and other PRACH messages. As a result, UE 520 and BS 510 may avoid wasting resources and avoid increasing latency for failed PRACH communications.

As indicated above, FIGS. 5A-5C are provided as examples. Other examples are possible and may differ from what is described in connection with FIGS. 5A-5C.

Figure 6:
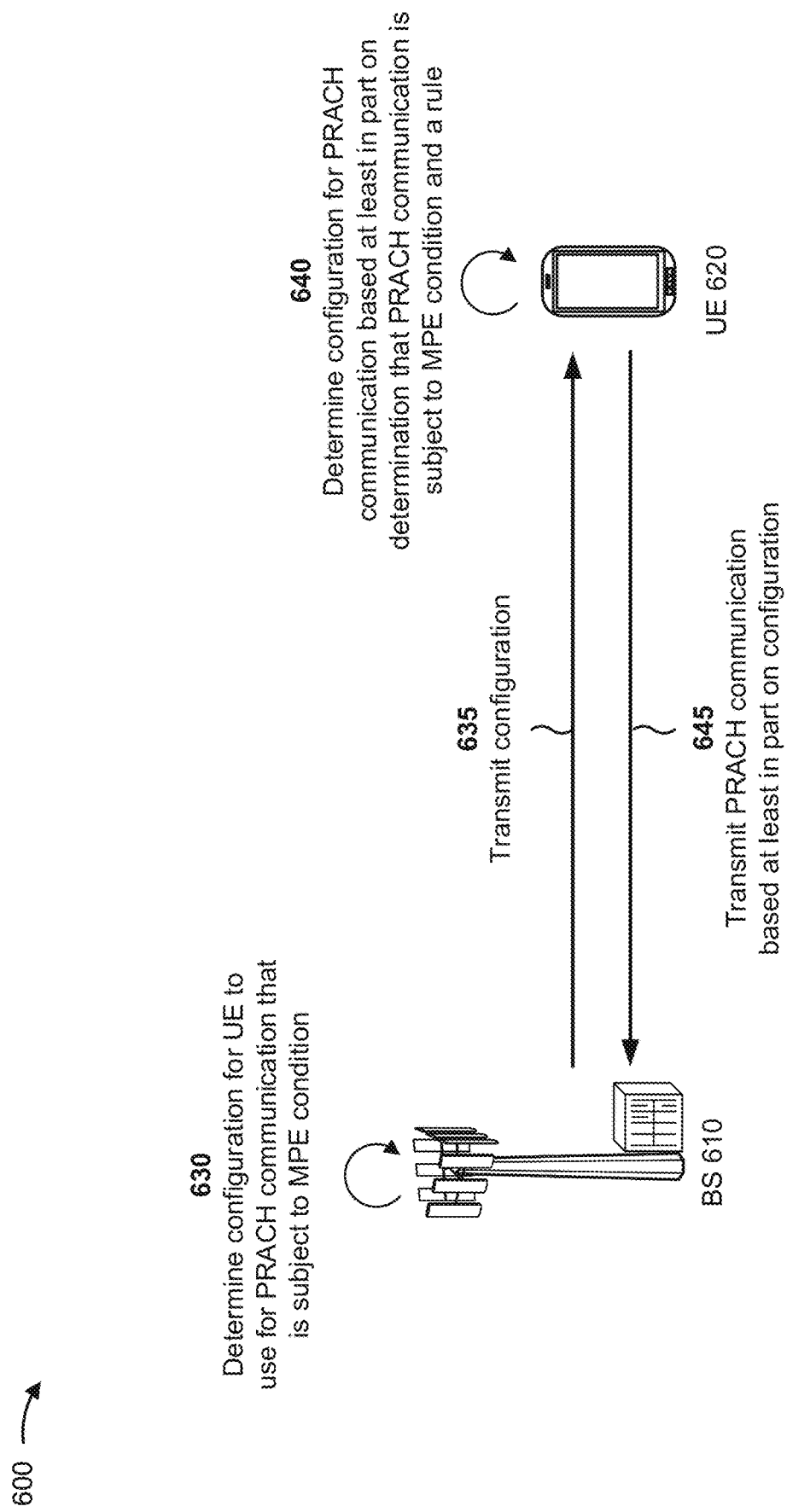
FIG. 6 illustrates an example of physical random access channel (PRACH) configuration for an MPE condition, in accordance with the present disclosure.

FIG. 6 illustrates an example 600 of PRACH configuration for an MPE condition, in accordance with the present disclosure. FIG. 6 shows a base station (BS) 610 (e.g., BS 110 depicted in FIGS. 1 and 2) and a UE 620 (e.g., UE 120 depicted in FIGS. 1 and 2) that may communicate with one another.

As shown by reference number 630, BS 610 may determine a configuration for UE 620 to use for a PRACH communication that is subject to an MPE condition. The configuration may specify a PRACH format, a PRACH length, a set of PRACH sequences, a bandwidth, or a combination thereof that is different than if the PRACH communication is not subject to an MPE condition. For example, the configuration may specify that the PRACH communication is to have a different PRACH format that is reduced in size or a number of fields so that an overall transmission time (and overall transmit power) is lower than for a regularly used PRACH format. In some aspects, the configuration may specify that the PRACH communication is to have a shorter PRACH length and/or fewer PRACH sequences. In some aspects, the configuration may specify that the PRACH communication is to be transmitted at another frequency or in another bandwidth.

As shown by reference number 635, BS 610 may transmit the configuration to UE 620, and UE 620 may receive the configuration. BS 610 may transmit the configuration via a remaining minimum system information (RMSI) message or another system information message.

As shown by reference number 640, UE 620 may determine a configuration for a PRACH communication based at least in part on a determination that a PRACH communication is subject to an MPE condition. UE 620 may determine if the PRACH communication is subject to an MPE condition by using one or more sensors (e.g., ultrasonic proximity sensor, thermal proximity sensor, diode sensor, and/or the like) to determine that a human or a body part of a human is nearby and/or may be in a beam path between UE 620 and BS 610. UE 620 may compare detection information, obtained by the one or more sensors, and a proximity threshold to determine whether there is an MPE condition. UE 620 may also make an MPE condition determination based at least in part on a frequency range, a spatial filter configuration, a power density, a transmit power, a length of the PRACH communication, and/or the like for the PRACH communication. The configuration for the PRACH communication may be the configuration received from BS 610, or UE 620 may use a configuration included in stored configuration information.

In some aspects, UE 620 may determine the configuration based at least in part on a combination of an MPE constraint and an SSB-based RSRP. For example, UE 620 may determine the configuration based at least in part on a result of comparing an RSRP for an SSB broadcast and an RSRP threshold that applies to an MPE constraint (e.g., when there is body proximity for an uplink transmission panel of UE 620 and/or a direction of the UE beam). The RSRP threshold that applies to an MPE constraint may be different (e.g., lower) than an RSRP threshold that does not apply to an MPE constraint. For example, the RSRP threshold that applies to an MPE constraint may be the RSRP threshold that does not apply to the MPE constraint minus a threshold offset. The threshold offset may be, for example, 5 decibels (dBs). A difference between the RSRP threshold that applies to an MPE constraint and the RSRP threshold that does not apply to the MPE may be based at least in part on a frequency band for the PRACH communication. In some aspects, UE 620 may receive an RSRP threshold from BS 610. In other words, UE 620 may choose another PRACH configuration with more transmission time or more transmit power if a strength of an SSB broadcast does not satisfy a threshold signal level, and that other PRACH configuration may be a first configuration if there is no MPE constraint and a second configuration if there is an MPE constraint.

In some aspects, UE 620 may determine the configuration by selecting a configuration from among multiple configurations, where one or more configurations apply to an MPE constraint and one or more configurations do not apply to the MPE constraint. In some aspects, UE 620 may be configured with rules for determining a configuration. A rule may specify conditions for selecting a configuration, or more specifically, a PRACH length, a PRACH format, a set of PRACH sequences, a bandwidth, and/or a combination thereof. For example, a rule may specify that a configuration with a shorter PRACH length and fewer PRACH sequences is to be used when the PRACH communication is subject to an MPE condition and a rule that an RSRP of an SSB broadcast does not satisfy a particular parameter, such as an RSRP threshold. UE 620 may determine the rules from stored configuration information or receive the rules and/or other parameters (e.g., proximity threshold, EIRP value) associated with a rule from BS 610 via system information (e.g., RMSI). In sum, UE 620 may determine a configuration for a PRACH communication that may meet an MPE constraint and still lead to a successful connection with BS 610.

As shown by reference number 645, UE 620 may transmit the PRACH communication based at least in part on the configuration. For example, UE 620 may transmit the PRACH communication with a length of 1 millisecond rather than 2 milliseconds. In another example, UE 620 transmits the PRACH communication with a set of fewer PRACH sequences.

As indicated above, FIG. 6 is provided as an example. Other examples are possible and may differ from what is described in connection with FIG. 6.

Figure 7:
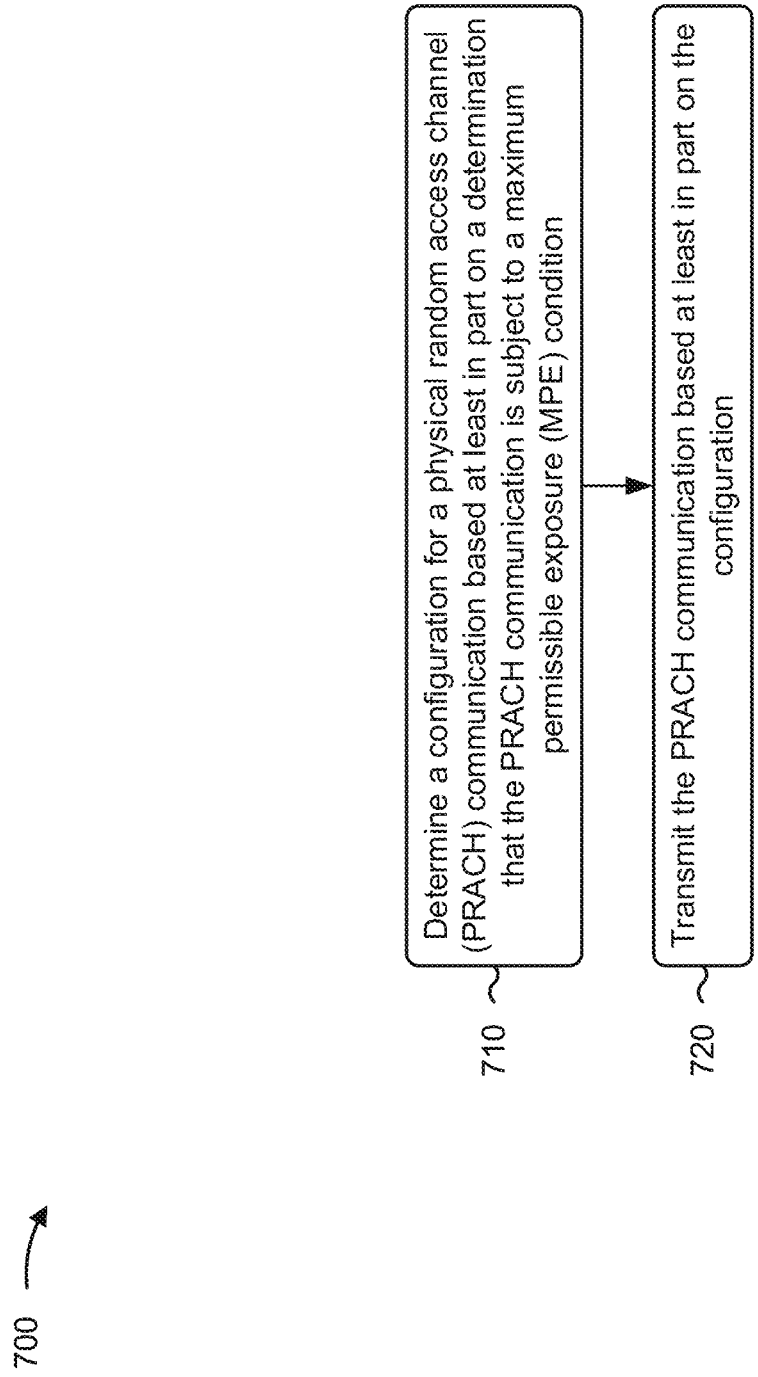
FIG. 7 is a diagram illustrating an example process performed, for example, by a UE, in accordance with the present disclosure.

FIG. 7 is a diagram illustrating an example process 700 performed, for example, by a UE, in accordance with the present disclosure. Example process 700 is an example where the UE (e.g., UE 120 depicted in FIGS. 1 and 2, UE 620 depicted in FIG. 6) performs operations associated with PRACH configuration for an MPE condition.

As shown in FIG. 7, in some aspects, process 700 may include determining a configuration for a PRACH communication based at least in part on a determination that the PRACH communication is subject to an MPE condition (block 710). For example, the UE (e.g., using receive processor 258, transmit processor 264, controller/processor 280, memory 282) may determine a configuration for a PRACH communication based at least in part on a determination that the PRACH communication is subject to an MPE condition, as described above.

As further shown in FIG. 7, in some aspects, process 700 may include transmitting the PRACH communication based at least in part on the configuration (block 720). For example, the UE (e.g., using receive processor 258, transmit processor 264, controller/processor 280, memory 282) may transmit the PRACH communication based at least in part on the configuration, as described above.

Process 700 may include additional aspects, such as any single aspect or any combination of aspects described below and/or in connection with one or more other processes described elsewhere herein.

In a first aspect, the configuration specifies one or more of a PRACH communication length, a PRACH format, a set of PRACH sequences, a PRACH bandwidth, or a combination of two or more of the PRACH communication length, the PRACH format, the set of PRACH sequences, or the PRACH bandwidth.

In a second aspect, alone or in combination with the first aspect, process 700 includes receiving the configuration from a base station.

In a third aspect, alone or in combination with one or more of the first and second aspects, receiving the configuration includes receiving the configuration via a remaining minimum system information message.

In a fourth aspect, alone or in combination with one or more of the first through third aspects, determining the configuration includes selecting the configuration from among a plurality of configurations, and the plurality of configurations includes a configuration that applies to an MPE constraint and a configuration that does not apply to an MPE constraint.

In a fifth aspect, alone or in combination with one or more of the first through fourth aspects, determining the configuration includes determining the configuration based at least in part on a combination of an MPE constraint and an RSRP of an SSB communication.

In a sixth aspect, alone or in combination with one or more of the first through fifth aspects, determining the configuration includes determining the configuration based at least in part on a result of comparing the RSRP of the SSB communication and an RSRP threshold that applies to the MPE constraint.

In a seventh aspect, alone or in combination with one or more of the first through sixth aspects, the RSRP threshold that applies to the MPE constraint is based at least in part on an RSRP threshold that does not apply to the MPE constraint and a threshold offset.

In an eighth aspect, alone or in combination with one or more of the first through seventh aspects, process 700 includes receiving the RSRP threshold that applies to the MPE constraint from a base station.

In a ninth aspect, alone or in combination with one or more of the first through eighth aspects, determining the configuration includes determining the configuration based at least in part on the rule.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
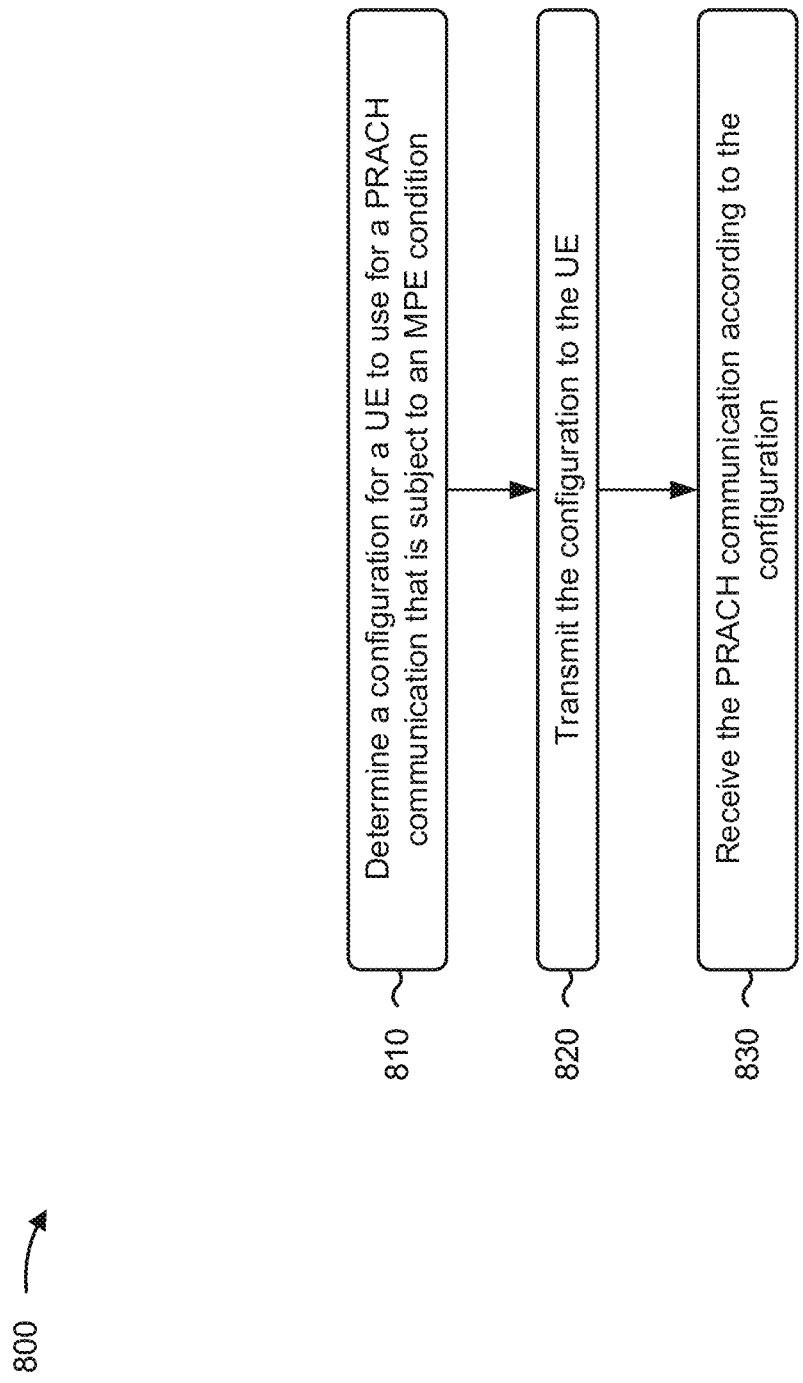
FIG. 8 is a diagram illustrating an example process performed, for example, by a base station, in accordance with the present disclosure.

FIG. 8 is a diagram illustrating an example process 800 performed, for example, by a base station, in accordance with the present disclosure. Example process 800 is an example where the base station (e.g., BS 110 depicted in FIGS. 1 and 2, BS 610 depicted in FIG. 6) performs operations associated with PRACH configuration for an MPE condition.

As shown in FIG. 8, in some aspects, process 800 may include determining a configuration for UE to use for a PRACH communication that is subject to an MPE condition (block 810). For example, the base station (e.g., using transmit processor 220, receive processor 238, controller/processor 240, memory 242) may determine a configuration for a UE to use for a PRACH communication that is subject to an MPE condition, as described above.

As further shown in FIG. 8, in some aspects, process 800 may include transmitting the configuration to the UE (block 820). For example, the base station (e.g., using transmit processor 220, receive processor 238, controller/processor 240, memory 242) may transmit the configuration to the UE, as described above.

As further shown in FIG. 8, in some aspects, process 800 may include receiving the PRACH communication according to the configuration (block 830). For example, the base station (e.g., using transmit processor 220, receive processor 238, controller/processor 240, memory 242) may receive the PRACH communication according to the configuration, as described above.

Process 800 may include additional aspects, such as any single aspect or any combination of aspects described below and/or in connection with one or more other processes described elsewhere herein.

In a first aspect, the configuration specifies one or more of a PRACH communication length, a PRACH format, a set of PRACH sequences, a PRACH bandwidth, or a combination of two or more of the PRACH communication length, the PRACH format, the set of PRACH sequences, or the PRACH bandwidth.

In a second aspect, alone or in combination with the first aspect, transmitting the configuration includes transmitting the configuration via a remaining minimum system information message.

In a third aspect, alone or in combination with one or more of the first and second aspects, the configuration is based at least in part on a combination of an MPE constraint for the PRACH communication and an RSRP of an SSB communication received by the UE.

In a fourth aspect, alone or in combination with one or more of the first through third aspects, process 800 includes transmitting an RSRP threshold for an MPE constraint to the UE.

In a fifth aspect, alone or in combination with one or more of the first through fourth aspects, the RSRP threshold for the MPE constraint is based at least in part on a non-MPE constraint RSRP threshold and a threshold offset.

In a sixth aspect, alone or in combination with one or more of the first through fifth aspects, process 800 includes transmitting a rule to permit the UE to determine the configuration.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
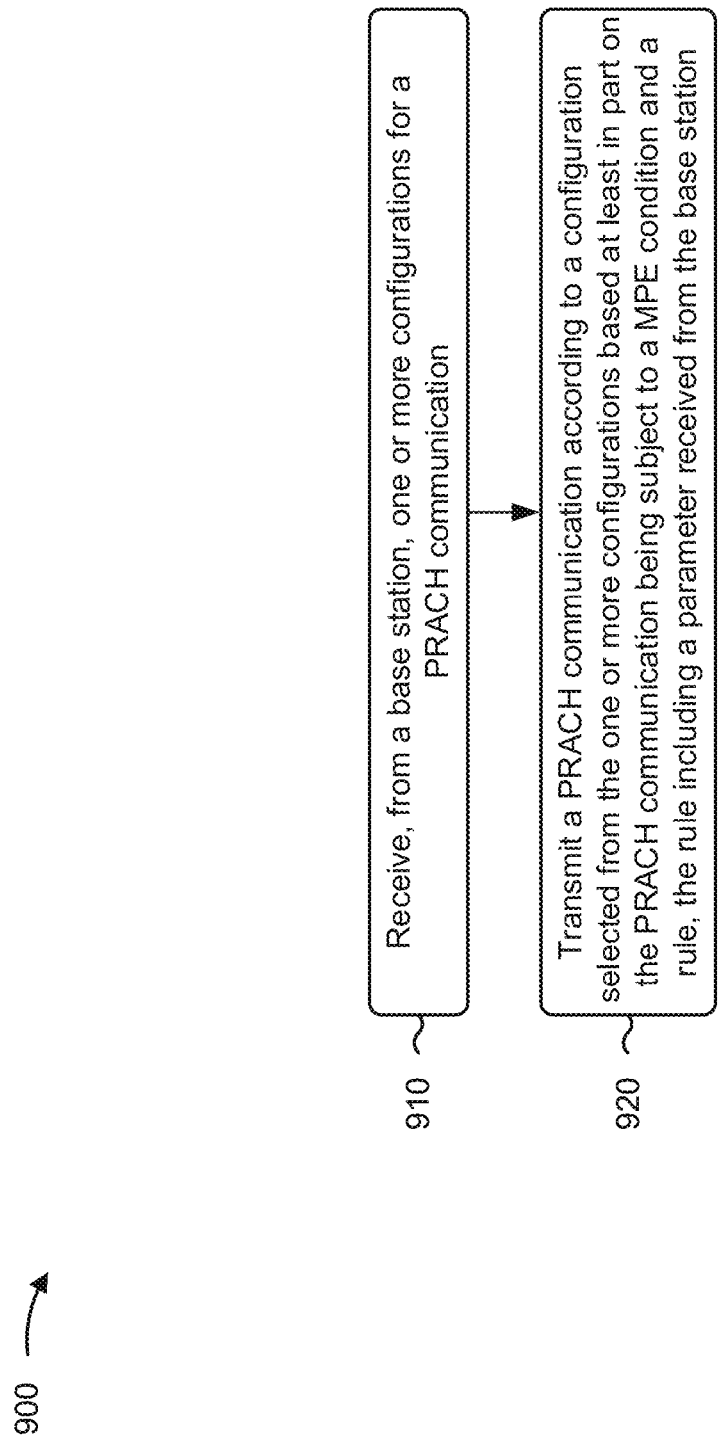
FIG. 9 is a diagram illustrating an example process performed, for example, by a UE, in accordance with the present disclosure.

FIG. 9 is a diagram illustrating an example process 900 performed, for example, by a UE, in accordance with the present disclosure. Example process 900 is an example where the UE (e.g., UE 120 depicted in FIGS. 1 and 2, UE 620 depicted in FIG. 6) performs operations associated with PRACH configuration for an MPE condition.

As shown in FIG. 9, in some aspects, process 900 may include receiving, from a base station, one or more configurations for a PRACH communication (block 910). For example, the UE (e.g., using receive processor 258, transmit processor 264, controller/processor 280, memory 282) may receive, from a base station, one or more configurations for a PRACH communication, as described above.

As further shown in FIG. 9, in some aspects, process 900 may include transmitting a PRACH communication according to a configuration selected from the one or more configurations based at least in part on the PRACH communication being subject to an MPE condition and a rule (block 920). For example, the UE (e.g., using receive processor 258, transmit processor 264, controller/processor 280, memory 282) may transmit a PRACH communication according to a configuration selected from the one or more configurations based at least in part on the PRACH communication being subject to an MPE condition and a rule, as described above. In some aspects, the rule may include a parameter received from the base station, as described above.

Process 900 may include additional aspects, such as any single aspect or any combination of aspects described below and/or in connection with one or more other processes described elsewhere herein.

In a first aspect, the configuration specifies one or more of a PRACH communication length, a PRACH format, a set of PRACH sequences, a PRACH bandwidth, or a combination of two or more of the PRACH communication length, the PRACH format, the set of PRACH sequences, or the PRACH bandwidth.

In a second aspect, alone or in combination with the first aspect, receiving the one or more configurations includes receiving the one or more configurations via an RMSI message.

In a third aspect, alone or in combination with one or more of the first and second aspects, the one or more configurations include a configuration that applies to an MPE constraint and a configuration that does not apply to an MPE constraint.

In a fourth aspect, alone or in combination with one or more of the first through third aspects, the configuration is selected based at least in part on a combination of an MPE constraint and an RSRP of an SSB communication.

In a fifth aspect, alone or in combination with one or more of the first through fourth aspects, the configuration is selected based at least in part on a result of comparing the RSRP of the SSB communication and an RSRP threshold that applies to the MPE constraint.

In a sixth aspect, alone or in combination with one or more of the first through fifth aspects, the RSRP threshold that applies to the MPE constraint is based at least in part on an RSRP threshold that does not apply to the MPE constraint, and a threshold offset.

In a seventh aspect, alone or in combination with one or more of the first through sixth aspects, the parameter received from the base station includes the RSRP threshold that applies to the MPE constraint.

In an eighth aspect, alone or in combination with one or more of the first through seventh aspects, process 900 includes receiving, from the base station, the rule for selecting the configuration.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
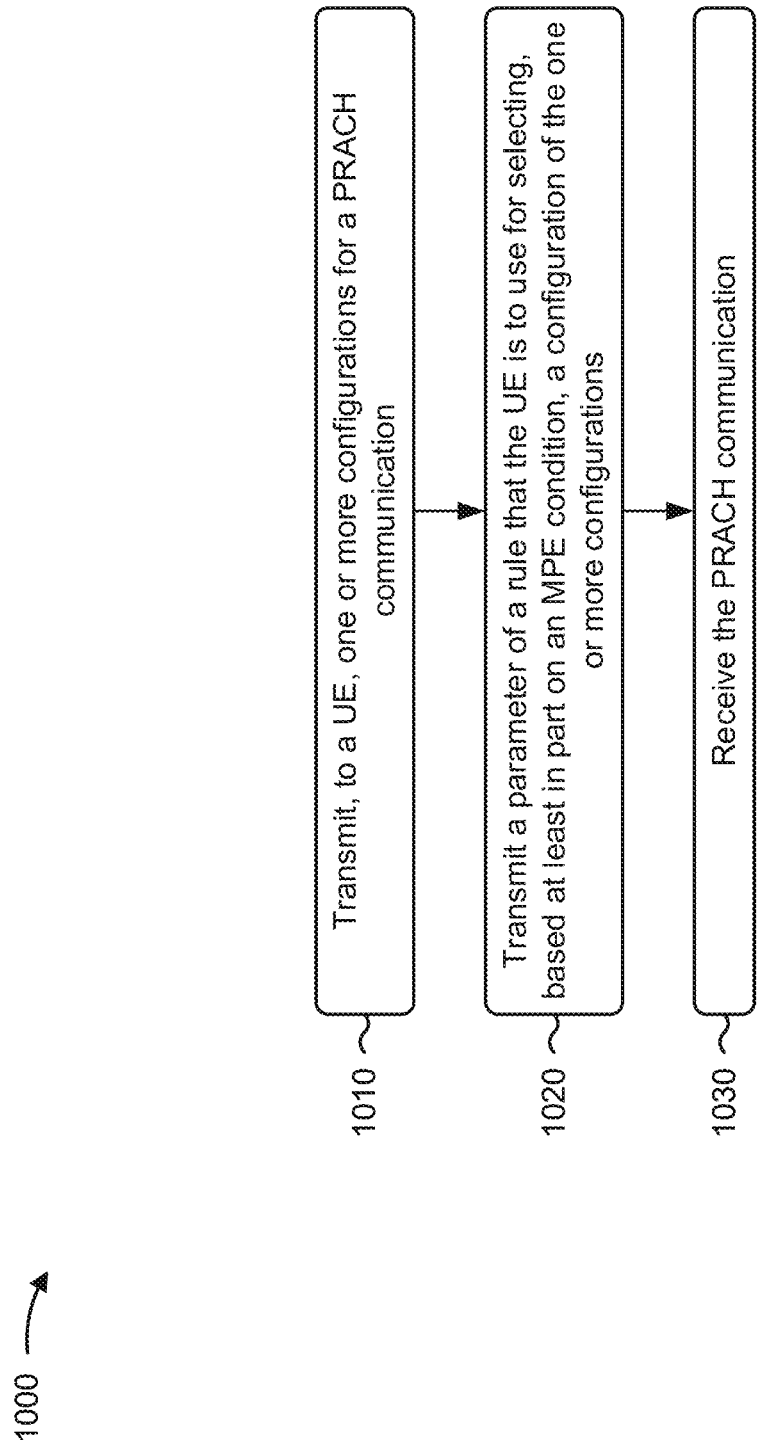
FIG. 10 is a diagram illustrating an example process performed, for example, by a base station, in accordance with the present disclosure.

FIG. 10 is a diagram illustrating an example process 1000 performed, for example, by a base station, in accordance with the present disclosure. Example process 1000 is an example where the base station (e.g., BS 110 depicted in FIGS. 1 and 2, BS 610 depicted in FIG. 6) performs operations associated with PRACH configuration for an MPE condition.

As shown in FIG. 10, in some aspects, process 1000 may include transmitting, to a UE, one or more configurations for a PRACH communication (block 1010). For example, the base station (e.g., using transmit processor 220, receive processor 238, controller/processor 240, memory 242) may transmit, to a UE, one or more configurations for a PRACH communication, as described above.

As further shown in FIG. 10, in some aspects, process 1000 may include transmitting a parameter of a rule that the UE is to use for selecting, based at least in part on an MPE condition, a configuration of the one or more configurations (block 1020). For example, the base station (e.g., using transmit processor 220, receive processor 238, controller/processor 240, memory 242) may transmit a parameter of a rule that the UE is to use for selecting, based at least in part on an MPE condition, a configuration of the one or more configurations, as described above.

As further shown in FIG. 10, in some aspects, process 1000 may include receiving the PRACH communication (block 1030). For example, the base station (e.g., using transmit processor 220, receive processor 238, controller/processor 240, memory 242) may receive the PRACH communication, as described above.

Process 1000 may include additional aspects, such as any single aspect or any combination of aspects described below and/or in connection with one or more other processes described elsewhere herein.

In a first aspect, each configuration of the one or more configurations specifies one or more of a PRACH communication length, a PRACH format, a set of PRACH sequences, a PRACH bandwidth, or a combination of two or more of the PRACH communication length, the PRACH format, the set of PRACH sequences, or the PRACH bandwidth.

In a second aspect, alone or in combination with the first aspect, transmitting the one or more configurations includes transmitting the one or more configurations via an RMSI message.

In a third aspect, alone or in combination with one or more of the first and second aspects, the parameter is an RSRP threshold that applies to an MPE constraint.

In a fourth aspect, alone or in combination with one or more of the first through third aspects, the RSRP threshold that applies to the MPE constraint is based at least in part on an RSRP threshold that does not apply to the MPE constraint and a threshold offset.

In a fifth aspect, alone or in combination with one or more of the first through fourth aspects, process 1000 includes transmitting the rule to the UE.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
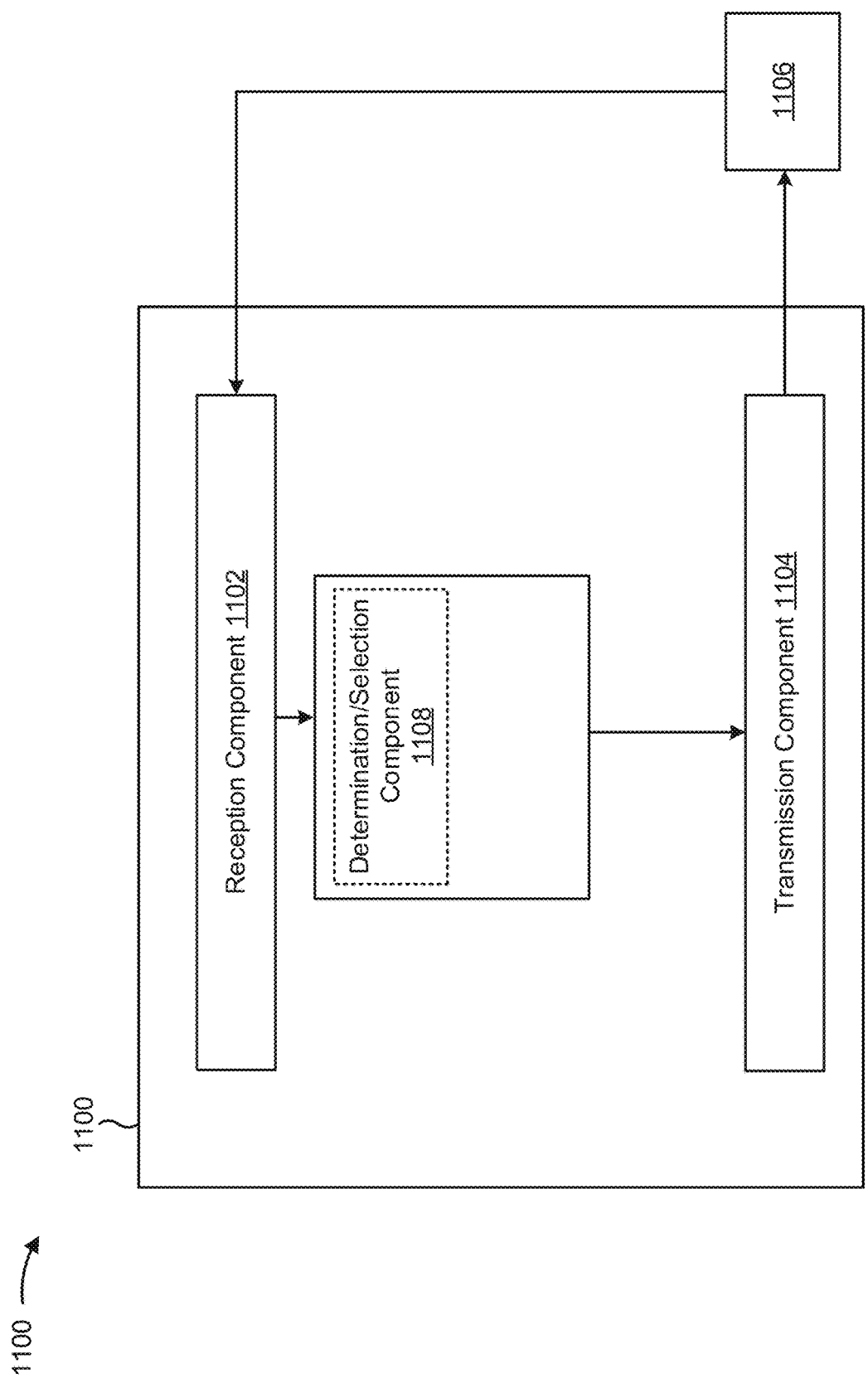
FIG. 11 is a block diagram of an example apparatus for wireless communication, in accordance with the present disclosure.

FIG. 11 is a block diagram of an example apparatus 1100 for wireless communication. The apparatus 1100 may be a UE, or a UE may include apparatus 1100. In some aspects, apparatus 1100 includes a reception component 1102 and a transmission component 1104, which may be in communication with one another (for example, via one or more buses and/or one or more other components). As shown, apparatus 1100 may communicate with another apparatus 1106 (such as a UE (e.g., UE 120e, among other examples), a base station (e.g., BS 110a, BS 110d, among other examples), or another wireless communication device) using reception component 1102 and transmission component 1104. As further shown, apparatus 1100 may include one or more of a determination/selection component 1108, among other examples.

In some aspects, apparatus 1100 may be configured to perform one or more operations described herein in connection with FIGS. 1-6. Additionally or alternatively, apparatus 1100 may be configured to perform one or more processes described herein, such as process 700 of FIG. 7, process 900 of FIG. 9, or a combination thereof. In some aspects, apparatus 1100 and/or one or more components shown in FIG. 11 may include one or more components of the network node described above in connection with FIG. 2. Additionally, or alternatively, one or more components shown in FIG. 11 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

Reception component 1102 may receive communications, such as reference signals, control information, data communications, or a combination thereof, from apparatus 1106. Reception component 1102 may provide received communications to one or more other components of apparatus 1100. In some aspects, reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of apparatus 1106. In some aspects, reception component 1102 may include one or more antennas, a demodulator, a MIMO detector, a receive processor, a controller/processor, a memory, or a combination thereof, of the network node described above in connection with FIG. 2.

Transmission component 1104 may transmit communications, such as reference signals, control information, data communications, or a combination thereof, to apparatus 1106. In some aspects, one or more other components of apparatus 1106 may generate communications and may provide the generated communications to transmission component 1104 for transmission to apparatus 1106. In some aspects, transmission component 1104 may perform signal processing on the generated communications (such as filtering, amplification, modulation, digital-to-analog conversion, multiplexing, interleaving, mapping, or encoding, among other examples), and may transmit the processed signals to apparatus 1106. In some aspects, transmission component 1104 may include one or more antennas, a modulator, a transmit MIMO processor, a transmit processor, a controller/processor, a memory, or a combination thereof, of the network node described above in connection with FIG. 2. In some aspects, transmission component 1104 may be co-located with reception component 1102 in a transceiver.

Determination/selection component 1108 may determine a configuration for a PRACH communication based at least in part on a determination that the PRACH communication is subject to an MPE condition. Transmission component 1104 may transmit the PRACH communication based at least in part on the configuration.

Reception component 1102 may receive, from apparatus 1106, one or more configurations for a PRACH communication. Transmission component 1104 may transmit a PRACH communication according to a configuration selected from the one or more configurations based at least in part on the PRACH communication being subject to an MPE condition and a rule, the rule including a parameter received from the base station. Determination/selection component 1108 may select the configuration based at least in part on a combination of an MPE constraint and an RSRP of an SSB communication.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally or alternatively, a set of (one or more) components shown in FIG. 11 may perform one or more functions described as being performed by another set of components shown in FIG. 11.

Figure 12:
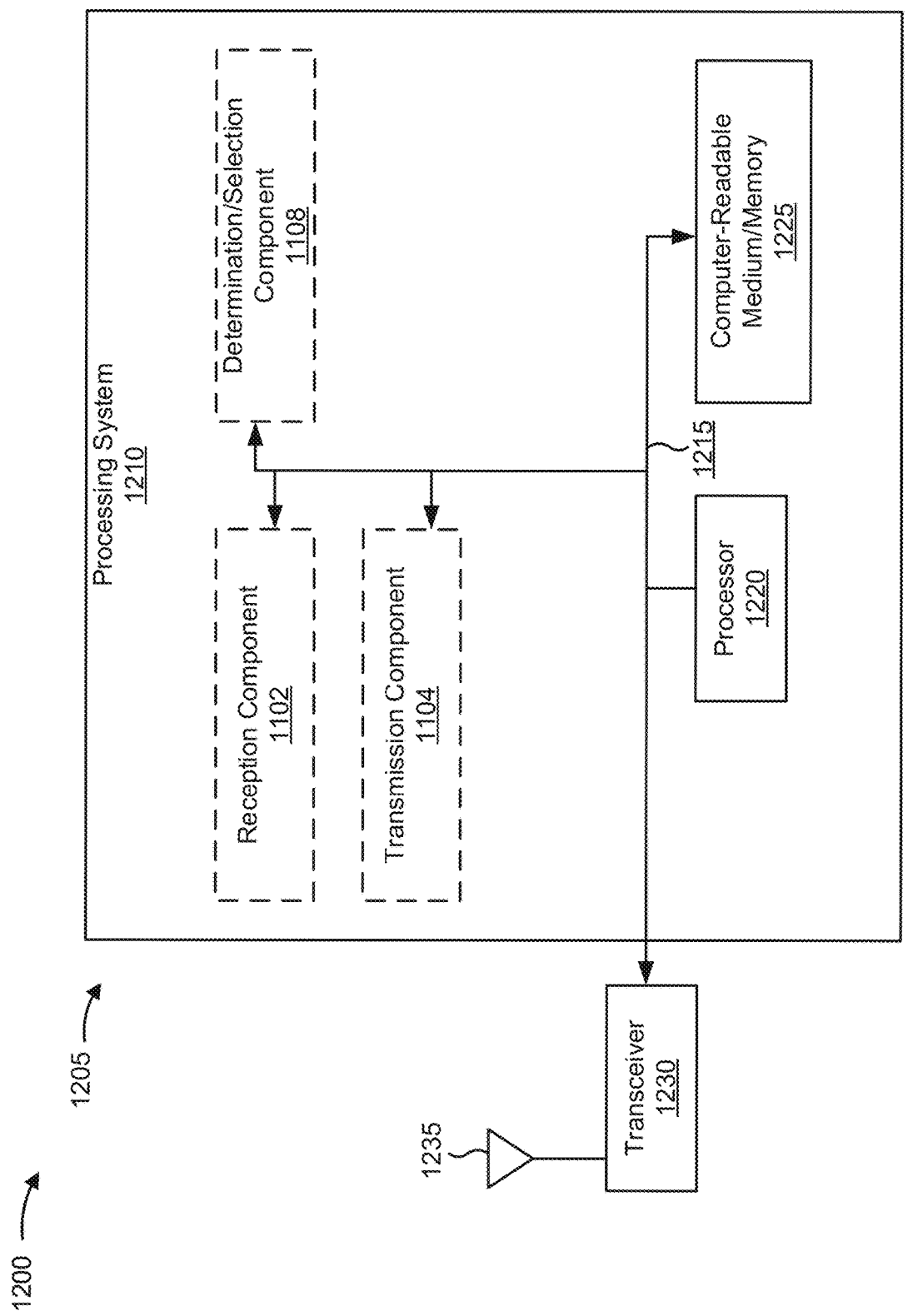
FIG. 12 is a diagram illustrating an example of a hardware implementation for an apparatus employing a processing system, in accordance with the present disclosure.

FIG. 12 is a diagram illustrating an example 1200 of a hardware implementation for an apparatus 1205 employing a processing system 1210. Apparatus 1205 may be a UE.

Processing system 1210 may be implemented with a bus architecture, represented generally by bus 1215. Bus 1215 may include any number of interconnecting buses and bridges depending on the specific application of processing system 1210 and the overall design constraints. Bus 1215 links together various circuits including one or more processors and/or hardware components, represented by processor 1220, the illustrated components, and computer-readable medium/memory 1225. Bus 1215 may also link various other circuits, such as timing sources, peripherals, voltage regulators, power management circuits, and/or the like.

Processing system 1210 may be coupled to a transceiver 1230. Transceiver 1230 is coupled to one or more antennas 1235. Transceiver 1230 provides a means for communicating with various other apparatuses over a transmission medium. Transceiver 1230 receives a signal from the one or more antennas 1235, extracts information from the received signal, and provides the extracted information to processing system 1210, specifically reception component 1102. In addition, transceiver 1230 receives information from processing system 1210, specifically transmission component 1104, and generates a signal to be applied to one or more antennas 1235 based at least in part on the received information.

Processing system 1210 includes a processor 1220 coupled to a computer-readable medium/memory 1225. Processor 1220 is responsible for general processing, including the execution of software stored on computer-readable medium/memory 1225. The software, when executed by processor 1220, causes processing system 1210 to perform the various functions described herein for any particular apparatus. Computer-readable medium/memory 1225 may also be used for storing data that is manipulated by processor 1220 when executing software. Processing system 1210 further includes at least one of the illustrated components. The components may be software modules running in processor 1220, resident/stored in computer readable medium/memory 1225, one or more hardware modules coupled to processor 1220, or some combination thereof.

In some aspects, processing system 1210 may be a component of base station 110 (e.g., BS 110a, BS 110d, among other examples) and may include the memory 242 and/or at least one of TX MIMO processor 230, RX processor 238, and/or controller/processor 240. In some aspects, processing system 1210 may be a component of UE 120 (e.g., UE 120e among other examples) and may include controller/processor 280, TX processor 264, TX MIMO processor 266, and/or RX processor 258. In some aspects, apparatus 1205 for wireless communication includes means for determining a configuration for a PRACH communication based at least in part on a determination that the PRACH communication is subject to an MPE condition, and/or means for transmitting the PRACH communication based at least in part on the configuration, among other examples. In some aspects, apparatus 1205 may include means for receiving, from a base station, one or more configurations for a PRACH communication, and/or means for transmitting a PRACH communication according to a configuration selected from the one or more configurations based at least in part on the PRACH communication being subject to an MPE condition and a rule, the rule including a parameter received from the base station. The aforementioned means may be one or more of the aforementioned components of apparatus 1100 and/or the processing system 1210 of apparatus 1205 configured to perform the functions recited by the aforementioned means. As described elsewhere herein, processing system 1210 may include TX MIMO processor 230, receive processor 238, and/or controller/processor 240. In one configuration, the aforementioned means may be TX MIMO processor 230, receive processor 238, and/or the controller/processor 240 configured to perform the functions and/or operations recited herein.

FIG. 12 is provided as an example. Other examples may differ from what is described in connection with FIG. 12.

Figure 13:
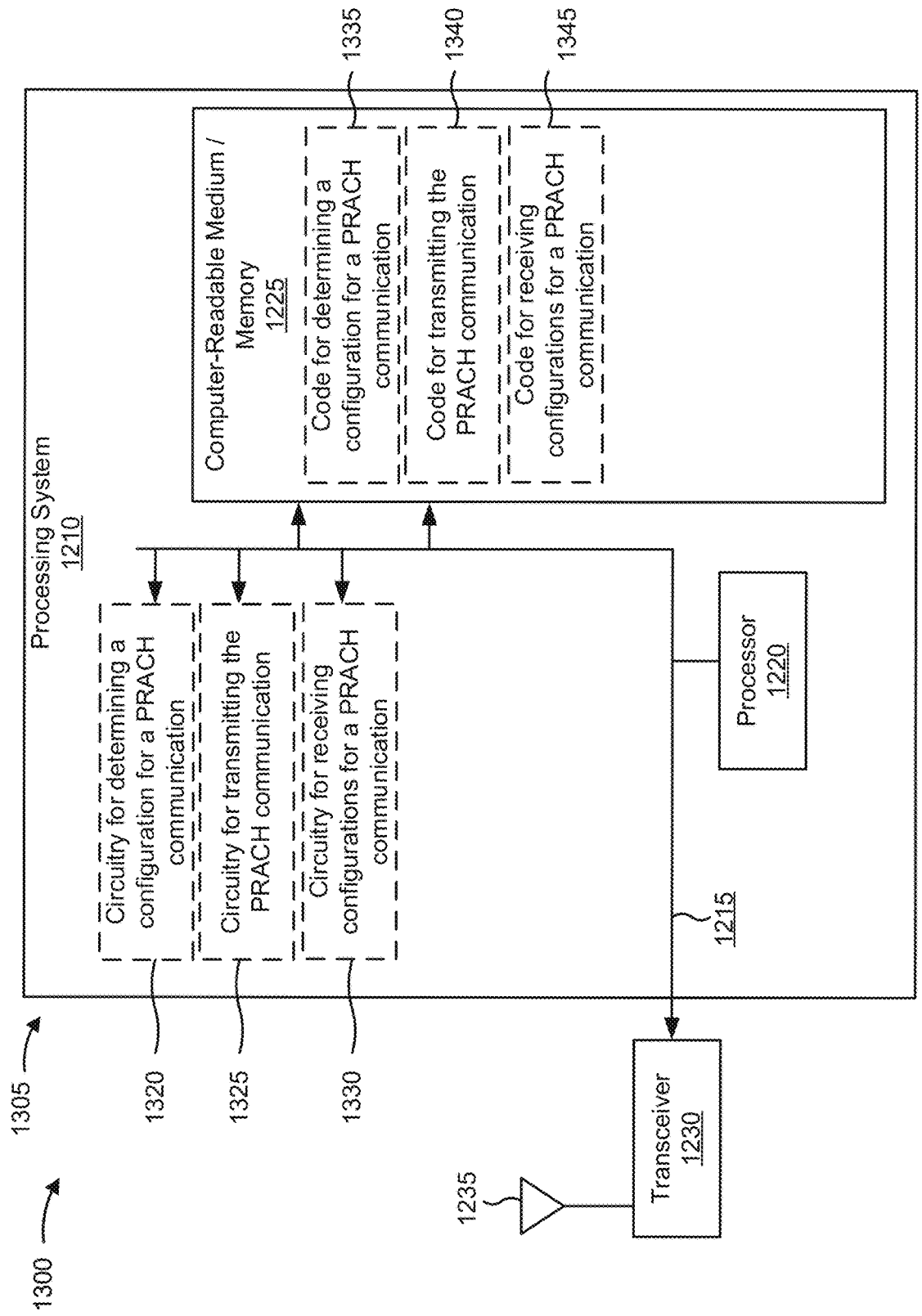
FIG. 13 is a diagram illustrating an example of an implementation of code and circuitry for an apparatus, in accordance with the present disclosure.

FIG. 13 is a diagram illustrating an example 1300 of an implementation of code and circuitry for an apparatus 1305. Apparatus 1305 may be a UE.

As further shown in FIG. 13, the apparatus may include circuitry for determining a configuration for a PRACH communication based at least in part on a determination that the PRACH communication is subject to an MPE condition (circuitry 1320). For example, the apparatus may include circuitry to enable the apparatus to determine the configuration based at least in part on a result of comparing the RSRP of the SSB communication and an SSB threshold that applies to the MPE constraint.

As further shown in FIG. 13, the apparatus may include circuitry for transmitting the PRACH communication based at least in part on the configuration (circuitry 1325). For example, the apparatus may include circuitry to enable the apparatus to transmit a PRACH communication according to a configuration selected from the one or more configurations based at least in part on the PRACH communication being subject to an MPE condition and a rule, the rule including a parameter received from the base station.

As further shown in FIG. 13, the apparatus may include circuitry for receiving one or more configurations for a PRACH communication (circuitry 1330). For example, the apparatus may include circuitry to enable the apparatus to receive one or more configurations for a PRACH communication. The apparatus may include circuitry to enable the apparatus to use a configuration that specifies one or more of a PRACH communication length, a PRACH format, a set of PRACH sequences, a PRACH bandwidth, or a combination of two or more of the PRACH communication length, the PRACH format, the set of PRACH sequences, or the PRACH bandwidth.

As further shown in FIG. 13, the apparatus may include, stored in computer-readable medium 1225, code for determining configuration for a PRACH communication based at least in part on a determination that the PRACH communication is subject to an MPE condition (code 1335). For example, the apparatus may include code that, when executed by the processor 1220, may cause processor 1220 to determine a configuration for a PRACH communication based at least in part on a determination that the PRACH communication is subject to an MPE condition.

As further shown in FIG. 12, the apparatus may include, stored in computer-readable medium 1225, code for transmitting the PRACH communication based at least in part on the configuration (code 1340). For example, the apparatus may include code that, when executed by processor 1220, may cause processor 1220 to cause transceiver 1230 to transmit the PRACH communication based at least in part on the configuration.

As further shown in FIG. 12, the apparatus may include, stored in computer-readable medium 1225, code for transmitting a PRACH communication according to a configuration selected from the one or more configurations based at least in part on the PRACH communication being subject to an MPE condition and a rule, the rule including that is received from the base station (code 1340). For example, the apparatus may include code that, when executed by processor 1220, may cause processor 1220 to cause transceiver 1230 to transmit the PRACH communication according to a configuration selected from the one or more configurations based at least in part on the PRACH communication being subject to an MPE condition and a rule, the rule including a parameter received from the base station.

As further shown in FIG. 12, the apparatus may include, stored in computer-readable medium 1225, code for receiving one or more configurations for a PRACH communication (code 1345). For example, the apparatus may include code that, when executed by processor 1220, may cause processor 1220 to cause transceiver 1230 to receive one or more configurations for a PRACH communication.

FIG. 13 is provided as an example. Other examples may differ from what is described in connection with FIG. 13.

Figure 14:
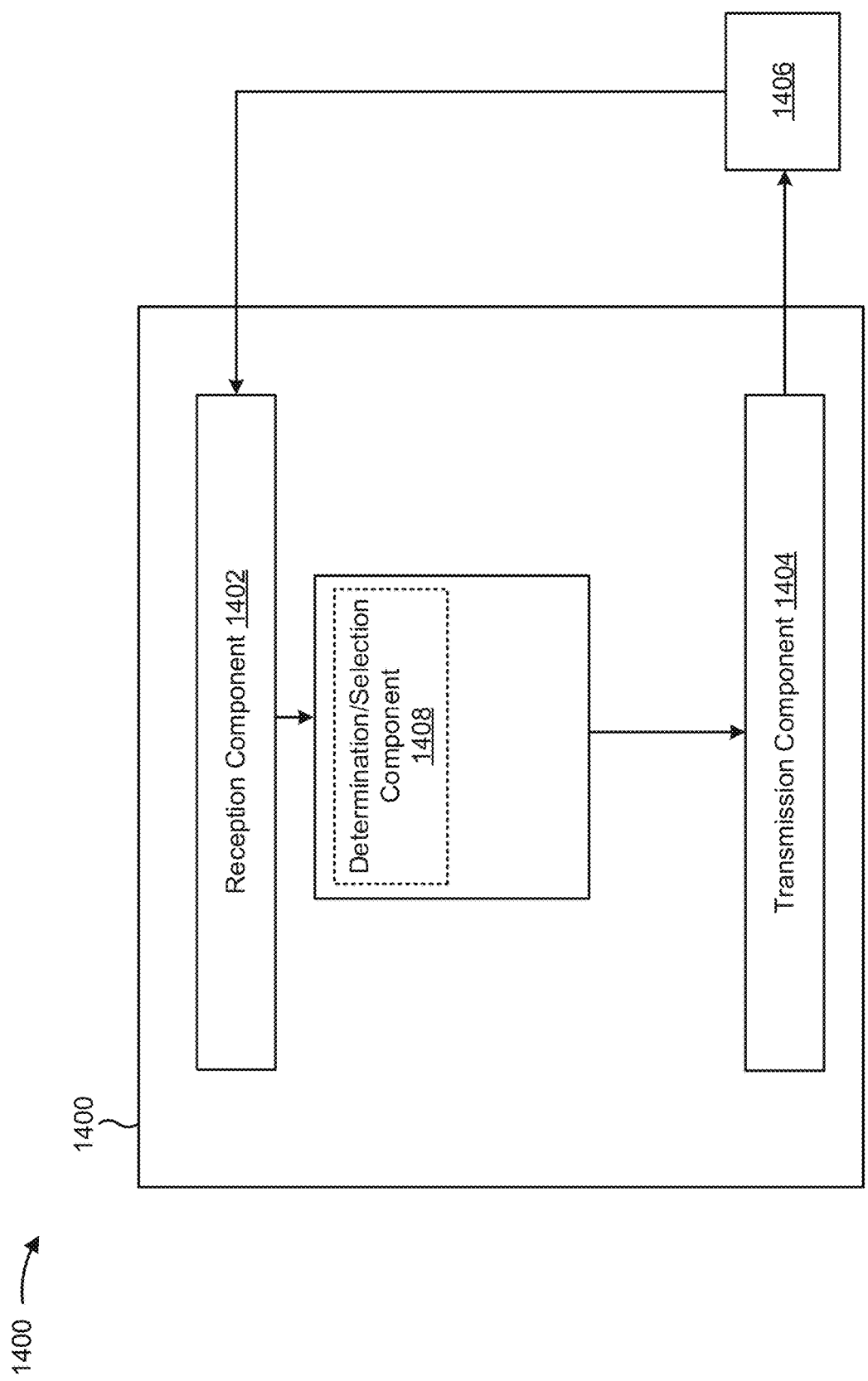
FIG. 14 is a block diagram of an example apparatus for wireless communication, in accordance with the present disclosure.

FIG. 14 is a block diagram of an example apparatus 1400 for wireless communication. The apparatus 1400 may be a UE, or a UE may include apparatus 1400. In some aspects, apparatus 1400 includes a reception component 1402 and a transmission component 1404, which may be in communication with one another (for example, via one or more buses and/or one or more other components). As shown, apparatus 1400 may communicate with another apparatus 1406 (such as a UE (e.g., UE 120e, among other examples), a base station (e.g., BS 110a, BS 110d, among other examples), or another wireless communication device) using reception component 1402 and transmission component 1404. As further shown, apparatus 1400 may include one or more of a determination/selection component 1408, among other examples.

In some aspects, apparatus 1400 may be configured to perform one or more operations described herein in connection with FIGS. 1-6. Additionally or alternatively, apparatus 1400 may be configured to perform one or more processes described herein, such as process 800 of FIG. 8, process 1000 of FIG. 10, or a combination thereof. In some aspects, apparatus 1400 and/or one or more components shown in FIG. 14 may include one or more components of the network node described above in connection with FIG. 2. Additionally, or alternatively, one or more components shown in FIG. 14 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

Reception component 1402 may receive communications, such as reference signals, control information, data communications, or a combination thereof, from apparatus 1406. Reception component 1402 may provide received communications to one or more other components of apparatus 1400. In some aspects, reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of apparatus 1406. In some aspects, reception component 1402 may include one or more antennas, a demodulator, a MIMO detector, a receive processor, a controller/processor, a memory, or a combination thereof, of the network node described above in connection with FIG. 2.

Transmission component 1404 may transmit communications, such as reference signals, control information, data communications, or a combination thereof, to apparatus 1406. In some aspects, one or more other components of apparatus 1406 may generate communications and may provide the generated communications to transmission component 1404 for transmission to apparatus 1406. In some aspects, transmission component 1404 may perform signal processing on the generated communications (such as filtering, amplification, modulation, digital-to-analog conversion, multiplexing, interleaving, mapping, or encoding, among other examples), and may transmit the processed signals to apparatus 1406. In some aspects, transmission component 1404 may include one or more antennas, a modulator, a transmit MIMO processor, a transmit processor, a controller/processor, a memory, or a combination thereof, of the network node described above in connection with FIG. 2. In some aspects, transmission component 1404 may be co-located with reception component 1402 in a transceiver.

Determination/selection component 1408 may determine a configuration for a UE to use for a PRACH communication that is subject to an MPE condition. Transmission component 1404 may transmit the configuration to the UE. Reception component 1402 may the PRACH communication according to the configuration.

Transmission component 1404 may transmit, to a UE, one or more configurations for a PRACH communication. Transmission component 1404 may transmit a parameter of a rule that the UE is to use for selecting, based at least in part on an MPE condition, a configuration of the one or more configurations. Reception component 1402 may receive the PRACH communication. Determination/selection component 1408 may determine the parameter from among other parameters based at least in part on a UE capability and/or traffic conditions.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally or alternatively, a set of (one or more) components shown in FIG. 14 may perform one or more functions described as being performed by another set of components shown in FIG. 14.

Figure 15:
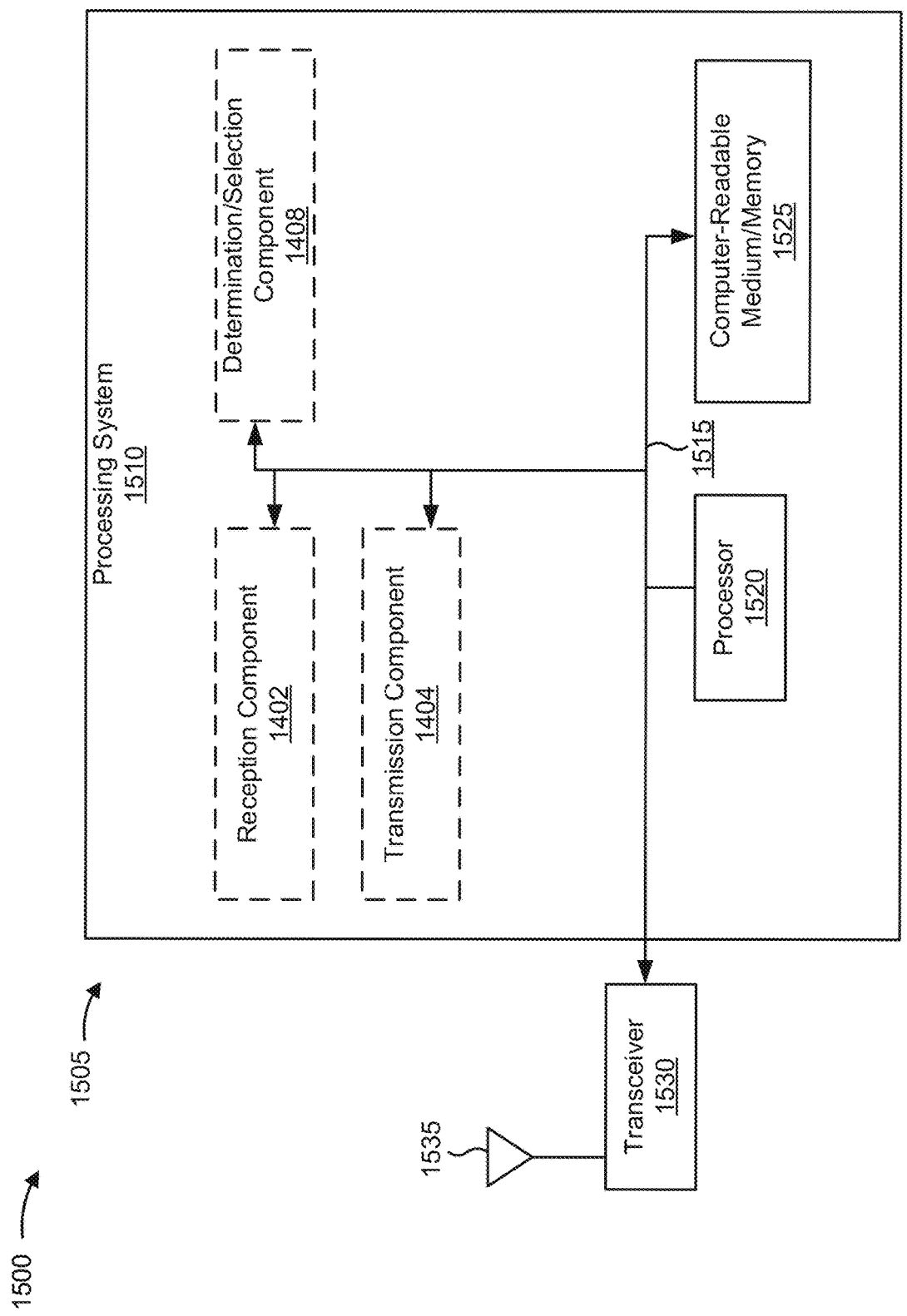
FIG. 15 is a diagram illustrating an example of a hardware implementation for an apparatus employing a processing system, in accordance with the present disclosure.

FIG. 15 is a diagram illustrating an example 1500 of a hardware implementation for an apparatus 1505 employing a processing system 1510. Apparatus 1505 may be a base station.

Processing system 1510 may be implemented with a bus architecture, represented generally by bus 1515. Bus 1515 may include any number of interconnecting buses and bridges depending on the specific application of processing system 1510 and the overall design constraints. Bus 1515 links together various circuits including one or more processors and/or hardware components, represented by processor 1520, the illustrated components, and computer-readable medium/memory 1525. Bus 1515 may also link various other circuits, such as timing sources, peripherals, voltage regulators, power management circuits, and/or the like.

Processing system 1510 may be coupled to a transceiver 1530. Transceiver 1530 is coupled to one or more antennas 1535. Transceiver 1530 provides a means for communicating with various other apparatuses over a transmission medium. Transceiver 1530 receives a signal from the one or more antennas 1535, extracts information from the received signal, and provides the extracted information to processing system 1510, specifically reception component 1402. In addition, transceiver 1530 receives information from processing system 1510, specifically transmission component 1404, and generates a signal to be applied to one or more antennas 1535 based at least in part on the received information.

Processing system 1510 includes a processor 1520 coupled to a computer-readable medium/memory 1525. Processor 1520 is responsible for general processing, including the execution of software stored on computer-readable medium/memory 1525. The software, when executed by processor 1520, causes processing system 1510 to perform the various functions described herein for any particular apparatus. Computer-readable medium/memory 1525 may also be used for storing data that is manipulated by processor 1520 when executing software. Processing system 1510 further includes at least one of the illustrated components. The components may be software modules running in processor 1520, resident/stored in computer readable medium/memory 1525, one or more hardware modules coupled to processor 1520, or some combination thereof.

In some aspects, processing system 1510 may be a component of base station 110 (e.g., BS 110a, BS 110d, among other examples) and may include the memory 242 and/or at least one of TX MIMO processor 230, RX processor 238, and/or controller/processor 240. In some aspects, processing system 1510 may be a component of UE 120 (e.g., UE 120e among other examples) and may include controller/processor 280, TX processor 264, TX MIMO processor 266, and/or RX processor 258. In some aspects, apparatus 1505 for wireless communication includes means for determining a configuration for a UE to use for a PRACH communication that is subject to an MPE condition, means for transmitting the configuration to the UE, and/or means for receiving the PRACH communication according to the configuration, among other examples. In some aspects, apparatus 1505 may include means for transmitting, to a UE, one or more configurations for a PRACH communication, means for transmitting a parameter of a rule that the UE is to use for selecting, based at least in part on an MPE condition, a configuration of the one or more configurations, and/or means for receiving the PRACH communication. The aforementioned means may be one or more of the aforementioned components of apparatus 1400 and/or the processing system 1510 of apparatus 1505 configured to perform the functions recited by the aforementioned means. As described elsewhere herein, processing system 1510 may include TX MIMO processor 230, receive processor 238, and/or controller/processor 240. In one configuration, the aforementioned means may be TX MIMO processor 230, receive processor 238, and/or the controller/processor 240 configured to perform the functions and/or operations recited herein.

FIG. 15 is provided as an example. Other examples may differ from what is described in connection with FIG. 15.

Figure 16:
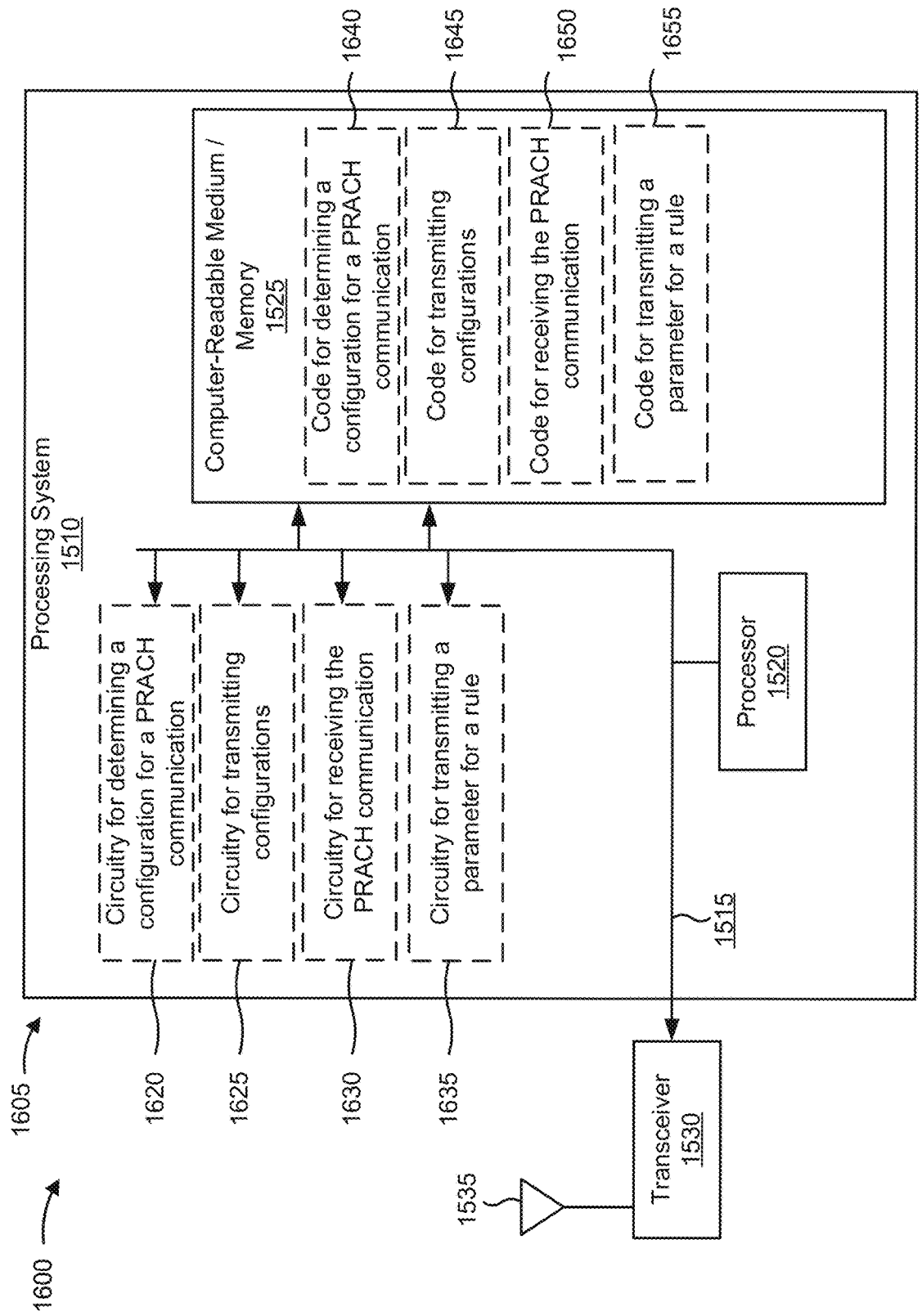
FIG. 16 is a diagram illustrating an example of an implementation of code and circuitry for an apparatus, in accordance with the present disclosure.

FIG. 16 is a diagram illustrating an example 1600 of an implementation of code and circuitry for an apparatus 1605. Apparatus 1605 may be a base station.

As further shown in FIG. 16, the apparatus may include circuitry for determining a configuration for a UE to use for a PRACH communication that is subject to an MPE condition (circuitry 1620). For example, the apparatus may include circuitry to enable the apparatus to determine a configuration for a UE to use for a PRACH communication that is subject to an MPE condition. The apparatus may include circuitry to enable the apparatus to determine a configuration that specifies one or more of a PRACH communication length, a PRACH format, a set of PRACH sequences, a PRACH bandwidth, or a combination of two or more of the PRACH communication length, the PRACH format, the set of PRACH sequences, or the PRACH bandwidth.

As further shown in FIG. 16, the apparatus may include circuitry for transmitting one or more configurations to the UE (circuitry 1625). For example, the apparatus may include circuitry to enable the apparatus to transmit the one or more configurations to the UE.

As further shown in FIG. 16, the apparatus may include circuitry for receiving the PRACH communication according to the configuration (circuitry 1630). For example, the apparatus may include circuitry to enable the apparatus to receive the PRACH communication according to the configuration.

As further shown in FIG. 16, the apparatus may include circuitry for transmitting a parameter of a rule that the UE is to use for selecting, based at least in part on an MPE condition, a configuration of the one or more configurations (circuitry 1635). For example, the apparatus may include circuitry to enable the apparatus to transmit a parameter of a rule that the UE is to use for selecting, based at least in part on an MPE condition, a configuration of the one or more configurations.

As further shown in FIG. 16, the apparatus may include, stored in computer-readable medium 1525, code for determining a configuration for a UE to use for a PRACH communication that is subject to an MPE condition (code 1640). For example, the apparatus may include code that, when executed by the processor 1520, may cause processor 1520 to determine a configuration for a UE to use for a PRACH communication that is subject to an MPE condition.

As further shown in FIG. 15, the apparatus may include, stored in computer-readable medium 1525, code for transmitting one or more configurations to the UE (code 1645). For example, the apparatus may include code that, when executed by processor 1520, may cause processor 1520 to cause transceiver 1530 to transmit one or more configurations to the UE.

As further shown in FIG. 15, the apparatus may include, stored in computer-readable medium 1525, code for receiving the PRACH communication according to the configuration (code 1650). For example, the apparatus may include code that, when executed by processor 1520, may cause processor 1520 to cause transceiver 1530 to receive the PRACH communication according to the configuration.

As further shown in FIG. 15, the apparatus may include, stored in computer-readable medium 1525, code for transmitting a parameter of a rule that the UE is to use for selecting, based at least in part on an MPE condition, a configuration of the one or more configurations (code 1655). For example, the apparatus may include code that, when executed by processor 1520, may cause processor 1520 to cause transceiver 1530 to transmit a parameter of a rule that the UE is to use for selecting, based at least in part on an MPE condition, a configuration of the one or more configurations.

FIG. 16 is provided as an example. Other examples may differ from what is described in connection with FIG. 16.

The foregoing disclosure provides illustration and description, but is not intended to be exhaustive or to limit the aspects to the precise form disclosed. Modifications and variations may be made in light of the above disclosure or may be acquired from practice of the aspects.

The following provides an overview of some Aspects of the present disclosure:

Aspect 1: A method of wireless communication performed by a user equipment (UE), comprising: transmitting a PRACH communication selected from the one or more configurations, based at least in part on a determination that the PRACH communication is subject to a maximum permissible exposure (MPE) condition and a rule that is based at least in part on information from the base station.

Aspect 2: The method of Aspect 1, wherein the configuration specifies one or more of a PRACH communication length, a PRACH format, a set of PRACH sequences, a PRACH bandwidth, or a combination of two or more of the PRACH communication length, the PRACH format, the set of PRACH sequences, or the PRACH bandwidth.

Aspect 3: The method of Aspect 1 or 2, further comprising receiving the configuration from a base station.

Aspect 4: The method of Aspect 3, wherein receiving the one or more configurations includes receiving the one or more configurations via a remaining minimum system information message.

Aspect 5: The method of any of Aspects 1-4, wherein determining the configuration includes selecting the configuration from among a plurality of configurations, and wherein the plurality of configurations includes a configuration that applies to an MPE constraint and a configuration that does not apply to an MPE constraint.

Aspect 6: The method of any of Aspects 1-5, wherein determining the configuration includes determining the configuration based at least in part on a combination of an MPE constraint and a reference signal receive power (RSRP) of a synchronization signal and physical broadcast channel block (SSB) communication.

Aspect 7: The method of Aspect 6, wherein determining the configuration includes determining the configuration based at least in part on a result of comparing the RSRP of the SSB communication and an SSB threshold that applies to the MPE constraint.

Aspect 8: The method of Aspect 7, wherein the SSB threshold that applies to the MPE constraint is based at least in part on an SSB threshold that does not apply to the MPE constraint and a threshold offset.

Aspect 9: The method of Aspect 6 or 7, further comprising receiving the SSB threshold that applies to the MPE constraint from a base station.

Aspect 10: The method of any of Aspects 1-9, further comprising receiving, from a base station, a rule for determining the configuration, and wherein determining the configuration includes determining the configuration based at least in part on the rule.

Aspect 11: A method of wireless communication performed by a base station, comprising: determining a configuration for a user equipment (UE) to use for a physical random access channel (PRACH) communication that is subject to a maximum permissible exposure (MPE) condition; transmitting the configuration to the UE; and receiving the PRACH communication according to the configuration.

Aspect 12: The method of Aspect 11, wherein the configuration specifies one or more of a PRACH communication length, a PRACH format, a set of PRACH sequences, a PRACH bandwidth, or a combination of two or more of the PRACH communication length, the PRACH format, the set of PRACH sequences, or the PRACH bandwidth.

Aspect 13: The method of Aspect 11 or 12, wherein transmitting the configuration includes transmitting the configuration via a remaining minimum system information message.

Aspect 14: The method of any of Aspects 11-13, wherein the configuration is based at least in part on a combination of an MPE constraint for the PRACH communication and a reference signal receive power (RSRP) of a synchronization signal and physical broadcast channel block (SSB) communication received by the UE.

Aspect 15: The method of any of Aspects 11-14, further comprising transmitting a reference signal receive power (RSRP) threshold for an MPE constraint to the UE.

Aspect 16: The method of Aspect 15, wherein the RSRP threshold for the MPE constraint is based at least in part on a non-MPE constraint RSRP threshold and a threshold offset.

Aspect 17: The method of any of Aspects 11-16, further comprising transmitting a rule to permit the UE to select the configuration.

Aspect 18: An apparatus for wireless communication at a device, comprising a processor; memory coupled with the processor; and instructions stored in the memory and executable by the processor to cause the apparatus to perform the method of one or more Aspects of Aspects 1-17.

Aspect 19: A device for wireless communication, comprising a memory and one or more processors coupled to the memory, the memory and the one or more processors configured to perform the method of one or more Aspects of Aspects 1-17.

Aspect 20: An apparatus for wireless communication, comprising at least one means for performing the method of one or more Aspects of Aspects 1-17.

Aspect 21: A non-transitory computer-readable medium storing code for wireless communication, the code comprising instructions executable by a processor to perform the method of one or more Aspects of Aspects 1-17.

Aspect 22: A non-transitory computer-readable medium storing a set of instructions for wireless communication, the set of instructions comprising one or more instructions that, when executed by one or more processors of a device, cause the device to perform the method of one or more Aspects of Aspects 1-17.

The following provides an overview of some other Aspects of the present disclosure:

Aspect 23: A method of wireless communication performed by a user equipment (UE), comprising: receiving, from a base station, one or more configurations for a physical random access channel (PRACH) communication; and transmitting a PRACH communication according to a configuration selected from the one or more configurations based at least in part on the PRACH communication being subject to a maximum permissible exposure (MPE) condition and a rule, the rule including a parameter received from the base station.

Aspect 24: The method of Aspect 23, wherein the configuration specifies one or more of a PRACH communication length, a PRACH format, a set of PRACH sequences, a PRACH bandwidth, or a combination of two or more of the PRACH communication length, the PRACH format, the set of PRACH sequences, or the PRACH bandwidth.

Aspect 25: The method of Aspect 23 or 24, wherein receiving the one or more configurations includes receiving the one or more configurations via a remaining minimum system information message.

Aspect 26: The method of any of Aspects 23-25, wherein the one or more configurations include a configuration that applies to an MPE constraint and a configuration that does not apply to an MPE constraint.

Aspect 27: The method of any of Aspects 23-26, wherein the configuration is selected based at least in part on a combination of an MPE constraint and a reference signal receive power (RSRP) of a synchronization signal and physical broadcast channel block (SSB) communication.

Aspect 28: The method of Aspect 27, wherein the configuration is selected based at least in part on a result of comparing the RSRP of the SSB communication and an RSRP threshold that applies to the MPE constraint.

Aspect 29: The method of Aspect 28, wherein the RSRP threshold that applies to the MPE constraint is based at least in part on an RSRP threshold that does not apply to the MPE constraint, and a threshold offset.

Aspect 30: The method of Aspect 28, wherein the parameter received from the base station includes the RSRP threshold that applies to the MPE constraint.

Aspect 31: The method of any of Aspects 23-30, further comprising receiving, from the base station, the rule for selecting the configuration.

Aspect 32: The method of any of Aspects 23-26, wherein the rule specifies that the configuration is selected based at least in part on a combination of an MPE constraint and a reference signal receive power (RSRP) of a synchronization signal and physical broadcast channel block (SSB) communication.

Aspect 33: The method of Aspect 32, wherein the rule specifies that the configuration is selected based at least in part on a result of comparing the RSRP of the SSB communication and an RSRP threshold that applies to the MPE constraint.

Aspect 34: The method of Aspect 33, wherein the RSRP threshold that applies to the MPE constraint is based at least in part on an RSRP threshold that does not apply to the MPE constraint, and a threshold offset.

Aspect 35: A method of wireless communication performed by a base station, comprising: transmitting, to a user equipment (UE), one or more configurations for a physical random access channel (PRACH) communication; transmitting a parameter of a rule that the UE is to use for selecting, based at least in part on a maximum permissible exposure (MPE) condition, a configuration of the one or more configurations; and receiving the PRACH communication.

Aspect 36: The method of Aspect 33, wherein each configuration of the one or more configurations specifies one or more of a PRACH communication length, a PRACH format, a set of PRACH sequences, a PRACH bandwidth, or a combination of two or more of the PRACH communication length, the PRACH format, the set of PRACH sequences, or the PRACH bandwidth.

Aspect 37: The method of Aspect 33 or 34, wherein transmitting the one or more configurations includes transmitting the one or more configurations via a remaining minimum system information message.

Aspect 38: The method of any of Aspects 35-37, wherein the parameter is a reference signal receive power (RSRP) threshold that applies to an MPE constraint.

Aspect 39: The method of Aspect 38, wherein the RSRP threshold that applies to the MPE constraint is based at least in part on an RSRP threshold that does not apply to the MPE constraint and a threshold offset.

Aspect 40: The method of any of Aspects 35-39, further comprising transmitting the rule to the UE.

Aspect 41: An apparatus for wireless communication at a device, comprising a processor; memory coupled with the processor; and instructions stored in the memory and executable by the processor to cause the apparatus to perform the method of one or more Aspects of Aspects 23-40.

Aspect 42: A device for wireless communication, comprising a memory and one or more processors coupled to the memory, the memory and the one or more processors configured to perform the method of one or more Aspects of Aspects 23-40.

Aspect 43: An apparatus for wireless communication, comprising at least one means for performing the method of one or more Aspects of Aspects 23-40.

Aspect 44: A non-transitory computer-readable medium storing code for wireless communication, the code comprising instructions executable by a processor to perform the method of one or more Aspects of Aspects 23-40.

Aspect 45: A non-transitory computer-readable medium storing a set of instructions for wireless communication, the set of instructions comprising one or more instructions that, when executed by one or more processors of a device, cause the device to perform the method of one or more Aspects of Aspects 23-40.

As used herein, the term "component" is intended to be broadly construed as hardware, firmware, and/or a combination of hardware and software. As used herein, a processor is implemented in hardware, firmware, and/or a combination of hardware and software.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), the apparatus comprising:
   a memory; and
   one or more processors, coupled to the memory, the one or more processors configured to:
      receive one or more configurations for a physical random access channel (PRACH) communication; and
      transmit a PRACH communication according to a configuration selected from the one or more configurations based at least in part on the PRACH communication being subject to a maximum permissible exposure (MPE) condition and a rule,
         the rule including a parameter received from a network entity, and
         the configuration being selected further based at least in part on a reference signal received power (RSRP) threshold that does not apply to an MPE constraint.

2. The apparatus of claim 1, wherein the configuration specifies one or more of a PRACH communication length, a PRACH format, a set of PRACH sequences, a PRACH bandwidth, or a combination thereof.

3. The apparatus of claim 1, wherein the parameter includes an RSRP threshold that applies to the MPE constraint.

4. The apparatus of claim 1, wherein the one or more processors, to receive the one or more configurations, are configured to receive the one or more configurations via a remaining minimum system information message.

5. The apparatus of claim 1, wherein the one or more configurations include a configuration that applies to the MPE constraint and a configuration that does not apply to the MPE constraint.

6. The apparatus of claim 1, wherein the configuration is selected based at least in part on an RSRP of a synchronization signal and physical broadcast channel block communication and an RSRP threshold that applies to the MPE constraint, and
   wherein the RSRP threshold that applies to the MPE constraint is based at least in part on the RSRP threshold that does not apply to the MPE constraint.

7. The apparatus of claim 6, wherein the configuration is selected based at least in part on a result of comparing the RSRP of the synchronization signal and physical broadcast channel block communication and the RSRP threshold that applies to the MPE constraint.

8. The apparatus of claim 6, wherein the RSRP threshold that applies to the MPE constraint is further based at least in part on a threshold offset.

9. The apparatus of claim 1, wherein the one or more processors are further configured to receive, from the network entity, the rule for selecting the configuration.

10. An apparatus for wireless communication, comprising:
    a memory; and
    one or more processors, coupled to the memory, configured to:
       transmit one or more configurations for a physical random access channel (PRACH) communication;
       transmit a parameter of a rule for selecting, based at least in part on a maximum permissible exposure (MPE) condition and a reference signal received power (RSRP) threshold that does not apply to an MPE constraint, a configuration of the one or more configurations; and
       receive the PRACH communication.

11. The apparatus of claim 10, wherein each configuration of the one or more configurations specifies one or more of a PRACH communication length, a PRACH format, a set of PRACH sequences, a PRACH bandwidth, or a combination thereof.

12. The apparatus of claim 10, wherein the parameter is an RSRP threshold that applies to the MPE constraint.

13. The apparatus of claim 12, wherein the RSRP threshold that applies to the MPE constraint is based at least in part on the RSRP threshold that does not apply to the MPE constraint and a threshold offset.

14. The apparatus of claim 10, wherein the one or more processors, to transmit the one or more configurations, are configured to transmit the one or more configurations via a remaining minimum system information message.

15. The apparatus of claim 10, wherein the one or more processors are further configured to transmit the rule to a user equipment (UE).

16. A method of wireless communication performed at an apparatus, the method comprising:
   receiving one or more configurations for a physical random access channel (PRACH) communication; and
   transmitting a PRACH communication according to a configuration selected from the one or more configurations based at least in part on the PRACH communication being subject to a maximum permissible exposure (MPE) condition and a rule,
      the rule including a parameter received from a network entity, and
      the configuration being selected further based at least in part on a reference signal received power (RSRP) threshold that does not apply to an MPE constraint.

17. The method of claim 16, wherein the configuration specifies one or more of a PRACH communication length, a PRACH format, a set of PRACH sequences, a PRACH bandwidth, or a combination of two or more of the PRACH communication length, the PRACH format, the set of PRACH sequences, or the PRACH bandwidth.

18. The method of claim 16, wherein the parameter includes an RSRP threshold that applies to the MPE constraint.

19. The method of claim 16, wherein receiving the one or more configurations includes receiving the one or more configurations via a remaining minimum system information message.

20. The method of claim 16, wherein the one or more configurations include a configuration that applies to the MPE constraint and a configuration that does not apply to the MPE constraint.

21. The method of claim 16, wherein the configuration is selected based at least in part on an RSRP of a synchronization signal and physical broadcast channel block communication and an RSRP threshold that applies to the MPE constraint, and
   wherein the RSRP threshold that applies to the MPE constraint is based at least in part on the RSRP threshold that does not apply to the MPE constraint.

22. The method of claim 21, wherein the configuration is selected based at least in part on a result of comparing the RSRP of the synchronization signal and physical broadcast channel block communication and the RSRP threshold that applies to the MPE constraint.

23. The method of claim 21, wherein the RSRP threshold that applies to the MPE constraint is further based at least in part on a threshold offset.

24. The method of claim 16, further comprising receiving, from the network entity, the rule for selecting the configuration.

25. A method of wireless communication performed at an apparatus, comprising:
   transmitting one or more configurations for a physical random access channel (PRACH) communication;
   transmitting a parameter of a rule for selecting, based at least in part on a maximum permissible exposure (MPE) condition and a reference signal received power (RSRP) threshold that does not apply to an MPE constraint, a configuration of the one or more configurations; and
   receiving the PRACH communication.

26. The method of claim 25, wherein each configuration of the one or more configurations specifies one or more of a PRACH communication length, a PRACH format, a set of PRACH sequences, a PRACH bandwidth, or a combination of two or more of the PRACH communication length, the PRACH format, the set of PRACH sequences, or the PRACH bandwidth.

27. The method of claim 25, wherein the parameter is an RSRP threshold that applies to the MPE constraint.

28. The method of claim 27, wherein the RSRP threshold that applies to the MPE constraint is based at least in part on the RSRP threshold that does not apply to the MPE constraint and a threshold offset.

29. The method of claim 25, wherein transmitting the one or more configurations includes transmitting the one or more configurations via a remaining minimum system information message.

30. The method of claim 25, further comprising transmitting the rule to a user equipment (UE).

31. A non-transitory computer-readable medium storing a set of instructions for wireless communication, the set of instructions comprising:
   one or more instructions that, when executed by one or more processors of an apparatus, cause the apparatus to:
      receive one or more configurations for a physical random access channel (PRACH) communication; and
      transmit a PRACH communication according to a configuration selected from the one or more configurations based at least in part on the PRACH communication being subject to a maximum permissible exposure (MPE) condition and a rule,
         the rule including a parameter received from a network entity, and
         the configuration being selected further based at least in part on a reference signal received power (RSRP) threshold that does not apply to an MPE constraint.

32. The non-transitory computer-readable medium of claim 31, wherein the configuration specifies one or more of a PRACH communication length, a PRACH format, a set of PRACH sequences, a PRACH bandwidth, or a combination thereof.

33. The non-transitory computer-readable medium of claim 31, wherein the parameter includes an RSRP threshold that applies to the MPE constraint.

34. The non-transitory computer-readable medium of claim 31, wherein the one or more instructions that cause the apparatus to receive the one or more configurations comprise one or more instructions that cause the apparatus to receive the one or more configurations via a remaining minimum system information message.

35. The non-transitory computer-readable medium of claim 31, wherein the one or more configurations include a configuration that applies to the MPE constraint and a configuration that does not apply to the MPE constraint.

36. The non-transitory computer-readable medium of claim 31, wherein the configuration is selected based at least in part on an RSRP of a synchronization signal and physical broadcast channel block communication and an RSRP threshold that applies to the MPE constraint, and
   wherein the RSRP threshold that applies to the MPE constraint is based at least in part on the RSRP threshold that does not apply to the MPE constraint.

37. The non-transitory computer-readable medium of claim 36, wherein the configuration is selected based at least in part on a result of comparing the RSRP of the synchronization signal and physical broadcast channel block communication and the RSRP threshold that applies to the MPE constraint.

38. The non-transitory computer-readable medium of claim 36, wherein the RSRP threshold that applies to the MPE constraint is further based at least in part on a threshold offset.

39. The non-transitory computer-readable medium of claim 31, wherein the one or more instructions further cause the apparatus to receive, from the network entity, the rule for selecting the configuration.

40. A non-transitory computer-readable medium storing a set of instructions for wireless communication, the set of instructions comprising:
 one or more instructions that, when executed by one or more processors of an apparatus, cause the apparatus to:
  transmit one or more configurations for a physical random access channel (PRACH) communication;
  transmit a parameter of a rule for selecting, based at least in part on a maximum permissible exposure (MPE) condition and a reference signal received power (RSRP) threshold that does not apply to an MPE constraint, a configuration of the one or more configurations; and
  receive the PRACH communication.

41. The non-transitory computer-readable medium of claim 40, wherein each configuration of the one or more configurations specifies one or more of a PRACH communication length, a PRACH format, a set of PRACH sequences, a PRACH bandwidth, or a combination thereof.

42. The non-transitory computer-readable medium of claim 40, wherein the parameter is an RSRP threshold that applies to the MPE constraint.

43. The non-transitory computer-readable medium of claim 42, wherein the RSRP threshold that applies to the MPE constraint is based at least in part on the RSRP threshold that does not apply to the MPE constraint and a threshold offset.

44. The non-transitory computer-readable medium of claim 40, wherein the one or more instructions that cause the apparatus to transmit the one or more configurations comprise one or more instructions that cause the apparatus to transmit the one or more configurations via a remaining minimum system information message.

45. The non-transitory computer-readable medium of claim 40, wherein the one or more instructions further cause the apparatus to transmit the rule to a user equipment (UE).

\* \* \* \* \*